US010454258B2

(12) United States Patent
Daniels

(10) Patent No.: US 10,454,258 B2
(45) Date of Patent: Oct. 22, 2019

(54) WALL-MOUNTED ELECTRICAL DEVICE COVER PLATE ASSEMBLY

(71) Applicant: LIBERTY HARDWARE MFG. CORP., Winston-Salem, NC (US)

(72) Inventor: James Leroy Daniels, Stokesdale, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 16/009,422

(22) Filed: Jun. 15, 2018

(65) Prior Publication Data

US 2018/0375311 A1 Dec. 27, 2018

Related U.S. Application Data

(60) Provisional application No. 62/525,362, filed on Jun. 27, 2017.

(51) Int. Cl.
*H02G 3/14* (2006.01)
*H01R 25/00* (2006.01)

(52) U.S. Cl.
CPC .............. *H02G 3/14* (2013.01); *H01R 25/006* (2013.01)

(58) Field of Classification Search
CPC ............ H02G 3/14; H02G 3/08; H02G 3/081; H01H 9/02; H01H 9/04; H01R 25/006; H01R 13/5213; H01R 13/52; H01R 13/46; H01R 13/447

USPC ........ 174/66, 67, 53, 58, 481; 220/241, 242, 220/3.2–3.8; D13/177; D8/353, 350, D8/349; 436/535, 536

See application file for complete search history.

(56) References Cited

U.S. PATENT DOCUMENTS

| 4,631,354 | A | * | 12/1986 | Boteler | H02G 3/18 |
| | | | | | 174/66 |
| 5,073,681 | A | * | 12/1991 | Hubben | H02G 3/14 |
| | | | | | 174/66 |
| 5,605,466 | A | * | 2/1997 | Devlin | H01R 13/447 |
| | | | | | 439/144 |
| 5,723,817 | A | * | 3/1998 | Arenas | H02G 3/14 |
| | | | | | 174/66 |
| 7,122,740 | B2 | * | 10/2006 | Xu | H02G 3/14 |
| | | | | | 174/66 |
| 7,282,642 | B2 | * | 10/2007 | Schmieta | H02G 3/14 |
| | | | | | 174/66 |
| 7,456,358 | B2 | * | 11/2008 | Swiencicki | H02G 3/14 |
| | | | | | 174/66 |
| 7,598,453 | B1 | | 10/2009 | Shotey et al. | |

(Continued)

*Primary Examiner* — Angel R Estrada

(74) *Attorney, Agent, or Firm* — Brooks Kushman P.C.; Lora Graentzdoerffer

(57) ABSTRACT

An electrical cover plate assembly has a subplate, a cover plate, and a fastener. The subplate has a first locating feature and a tab, and is sized to be mounted to an electrical device via attachment points associated with the electrical device. The cover plate is sized to extend over the subplate, and forms a second locating feature positioned to cooperate with the first locating feature to locate the cover plate relative to the subplate. The cover plate defines a threaded aperture extending through a peripheral rim of the cover plate and positioned to be aligned with the tab. A threaded fastener cooperates with the threaded aperture and engages the cover plate and the tab of the subplate to fasten the cover plate to the subplate.

19 Claims, 18 Drawing Sheets

(56) References Cited

U.S. PATENT DOCUMENTS

| | | |
|---|---|---|
| 7,683,257 B1 | 3/2010 | Shotey et al. |
| 7,902,458 B2 * | 3/2011 | Eshelman ................ H02G 3/14 |
| | | 174/66 |
| 7,947,903 B2 | 5/2011 | Peck |
| 8,592,681 B2 | 11/2013 | Alderson et al. |
| 9,148,005 B2 | 9/2015 | Forrest et al. |
| 2014/0246218 A1 | 9/2014 | Shotey |

* cited by examiner

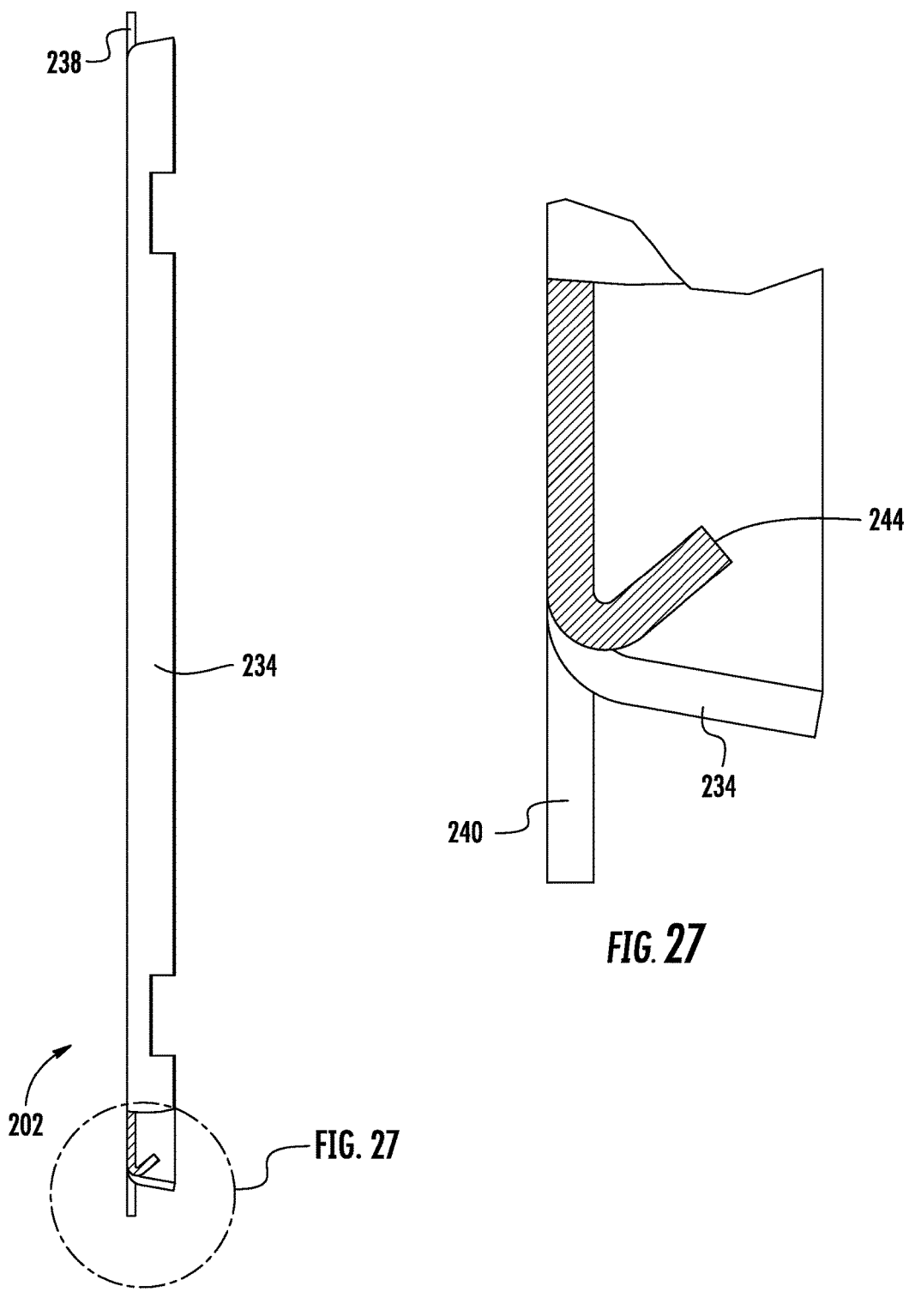

WALL-MOUNTED ELECTRICAL DEVICE COVER PLATE ASSEMBLY

CROSS-REFERENCE TO RELATED APPLICATIONS

This application claims the benefit of U.S. provisional application Ser. No. 62/525,362 filed Jun. 27, 2017, the disclosure of which is hereby incorporated in its entirety by reference herein.

TECHNICAL FIELD

Various embodiments relate to cover plate assemblies for wall mounted electrical devices.

BACKGROUND

The prior art has offered various cover plate assemblies for wall mounted electrical devices. The cover plate assemblies often employ externally visible fasteners. The prior art has also offered cover plate assemblies with concealed fasteners. Such cover plates are often formed of a plastic material with integral fasteners. The National Electrical Manufacturers Association has provided a standard ratio tolerance between long and short sides on a single gang wall plate of 1.4 to 1 minimum. An example of a cover plate assembly is provided in U.S. Pat. No. 9,148,005 B2.

SUMMARY

According to at least one embodiment, a cover plate assembly is provided with a cover plate to enclose an electrical device. At least one fastener is provided to fasten the cover plate relative to the electrical device.

According to an embodiment, an electrical cover plate assembly is provided with a subplate with a first substrate having a first edge and a second edge opposite to the first edge. The first substrate forms a series of mounting slots, with each mounting slot sized to receive a corresponding fastener of an electrical device for mounting the subplate to the electrical device. The assembly has a first tab extending outwardly from the first edge of the first substrate, and a second tab extending outwardly from the second edge of the first substrate. A cover plate is sized to extend over the subplate, with a second substrate sized to be mounted on the first substrate, and a peripheral rim extending from the second substrate to engage a wall and conceal the subplate. The cover plate defines a first locating slot positioned to receive the second tab of the subplate to locate and position the cover plate relative to the subplate. The cover plate defines an aperture extending through the peripheral rim and positioned to be aligned with the first tab of the subplate. A fastener is sized to extend into the aperture and engage the cover plate and a surface of the first tab of the subplate to fasten the cover plate to the subplate.

According to another embodiment, an electrical cover plate assembly is provided with a subplate. The subplate has a first substrate having a first edge and a second edge opposite to the first edge, and the first substrate forms a series of mounting slots. Each mounting slot is sized to receive a corresponding fastener of an electrical device for mounting the subplate to the electrical device. A first tab extends outwardly from the first edge of the first substrate. A second tab extends outwardly from the second edge of the first substrate. A cover plate is sized to extend over the subplate, with a second substrate sized to be mounted on the first substrate, and a peripheral rim extending from the second substrate to engage a wall and conceal the subplate. The cover plate defines a first rib to cooperate with the second tab of the subplate to locate and position the cover plate relative to the subplate. The cover plate defines an aperture extending through the peripheral rim and positioned to be aligned with the first tab of the subplate. A fastener is sized to extend into the aperture and engage the cover plate and a surface of the first tab of the subplate to fasten the cover plate to the subplate.

According to yet another embodiment, an electrical cover plate assembly is provided. A subplate has a first locating feature and a tab. The subplate is sized to be mounted to an electrical device via attachment points associated with the electrical device. A cover plate is sized to extend over the subplate. The cover plate forms a second locating feature positioned to cooperate with the first locating feature to locate the cover plate relative to the subplate. The cover plate defines a threaded aperture extending through a peripheral rim of the cover plate and positioned to be aligned with the tab. A threaded fastener cooperates with the threaded aperture and engages the cover plate and the tab of the subplate to fasten the cover plate to the subplate. At least one of the first locating feature, the second locating feature, the tab, and the fastener is angled such that a compression force applied from the fastener to the tab biases the cover plate toward the subplate.

BRIEF DESCRIPTION OF THE DRAWINGS

FIG. 26 is an elevation view of the subplate for the cover plate assembly of FIG. 23;

FIG. 27 is an enlarged elevation view of the subplate as shown in FIG. 26;

DETAILED DESCRIPTION

As required, detailed embodiments of the present invention are disclosed herein; however, it is to be understood that the disclosed embodiments are merely examples of the invention and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventional cover plates are held in place by exposed screws or exposed fasteners through the face of the cover plate. Various embodiments of the present disclosure provide for a cover plate assembly to conceal these fasteners and provide a clean appearance for the cover plate.

Various embodiments of the present disclosure include a hidden fastener style wall cover plate that is secure in attaching to the underlying device. The cover plate may be formed from a metal or metal alloy or other materials, and may include various surface finishes such as satin nickel, oil rubbed bronze, etc. to provide a desired appearance. In forming the cover plate, a threaded aperture is provided for use with a fastener such as a set screw to provide the secure attachment to a subplate or back plate without visible fasteners or screws.

Various embodiments of the present disclosure provide for an assembly that includes subplate, a cover plate and one or more fasteners such as set screws. The components of the assembly may be formed from metal or other materials as described herein. The subplate is attached to an existing electrical device on a wall using the fasteners or attachment points associated with the electrical device. Associated locating features, such as tabs and slots, are provided on the subplate and the cover plate and cooperate with one another to locate the cover plate relative to the subplate. In one example, the subplate has angled tabs that fit into slots on a rear side of the cover plate. The cover plate is held in place by one or more fasteners such as set screws that engage the cover plate and the subplate, and prevent the cover plate from disengaging from the subplate. The set screws may be provided along a peripheral edge of the cover plate to reduce their visibility and provide a clean appearance for the cover plate assembly.

In various embodiments, the cover plate is formed from metal or a metal alloy and has a surface finish that is provided via a plating process, powder coat process, or painting process.

FIGS. 1-5 illustrate an embodiment of a cover plate assembly 100 for covering and enclosing a wall mounted electrical device. For example, the cover plate assembly 100 is depicted for covering a one-gang electrical power outlet. The assembly 100 has a subplate 102, a cover plate 104, and a fastener such as a set screw 106.

Figure 6:
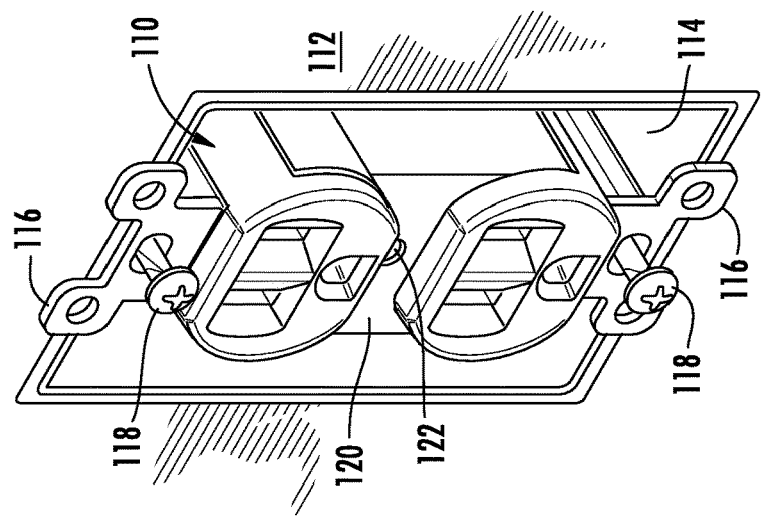
FIG. 6 is a perspective view of a wall mounted electrical device for use with a cover plate assembly.
Figure 4:
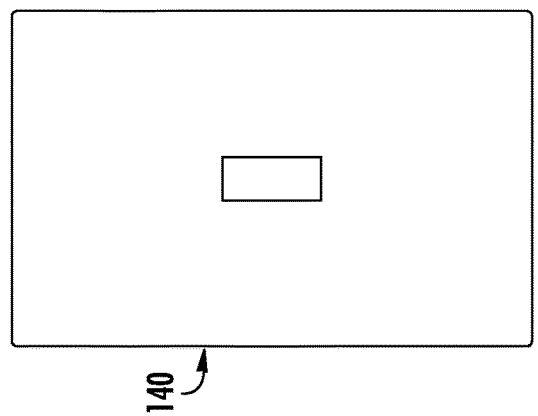
FIG. 4 is an elevation view of the cover plate of FIG. 3.
Figure 5:
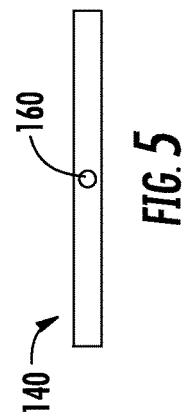
FIG. 5 is an elevation view of the cover plate of FIG. 3.
Figure 9:
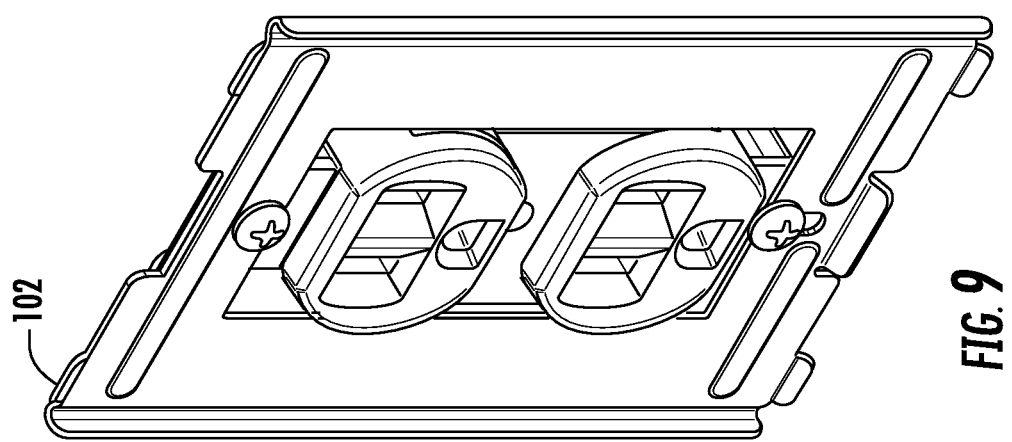
FIG. 9 is a perspective view of the subplate of the cover plate assembly of FIG. 1 during installation onto the device of FIG. 6.

FIG. 6 illustrates an example of a wall mounted electrical device 110 is shown in FIG. 6. The wall mounted electrical device 110 connects to the wall or surrounding structure 112. The wall mounted electrical device 110 is connected to a junction box 114 or other structure in the wall 112 via mounting straps 116 and fasteners 118.

The device 110 may be provided with electrical outlets as shown, a switch, other outlets or jacks, or a combination thereof. Examples of outlets and jacks include those for use with audio and visual cables, telephone and data cables, coaxial cables, and the like. Examples of switches include both toggle and decorator rocker style switches. The device 110 may additionally include a dimmer switch. In other examples, the cover plate assembly 100 may include a blank cover plate as described below, such that the cover plate assembly 100 connects directly to an empty box to cover the box.

The device is shown as being a single gang; however, the device may be a double gang, triple gang, or quadruple gang, or may include more than four gangs.

The device 110 is typically standardized with a yoke 120 with one or more threaded apertures 122 for receipt of threaded fasteners for installing a conventional cover plate.

Referring back to FIGS. 1-5, the subplate 102 is provided with a substrate 130 that is adapted to be mounted to the electrical device 110 for enclosing the electrical device 110. The substrate 130 may, for example, include a series of slots or apertures for receipt of heads of threaded fasteners for fastening the subplate 102 to the mounting straps 116 of the electrical device. In the example shown, the substrate 130 has a first slot 132 and a second slot 134. The slots 132, 134 may have different lengths as shown, and the second slot 134 may be longer than the first slot 132. In the example shown, the lower slot 134 is longer than the upper slot 132, and in alternative embodiments, the upper slot 132 may be longer than the lower slot 134. In further examples, the slots 132, 134 may be the same length; however, different length slots may aid in installation of the subplate 102 onto the device 110. The slots 132, 134 may be oriented in any suitable pattern associated with a fastener 118 pattern for mounting straps 116 of an electrical device 110, or with a fastener pattern for a junction box 114.

A height and a width of the subplate 102 are sized to effectively cover a standard electrical wall box 114 opening. The substrate 130 also includes access openings 136 for access to the electrical device 110.

The subplate 102 can be fabricated of a pre-galvanized stamped steel in order to meet corrosion resistance requirement of Underwriters Laboratories Standard UL514D (Cover Plates for Flush-Mounted Wiring Devices). The access openings 136 within the substrate 130 of the subplate 102 are utilized to make adjustments of the electrical devices. The overall size of the subplate 102 and the slots 132, 134 are sized and designed to meet National Electrical Manufacturers Association (NEMA) standard WD6 which covers Wiring Device Dimensional Specifications. Typically, the access openings 136 are fitted for standard toggle switches, antique push button switches, duplex devices and Ground Fault Circuit Interrupter (GFCI) receptacles, other switches, outlets, and cables as described above, and the like.

The substrate 130 of the subplate 102 may also include clearance recesses 137 or clearance apertures aligned with a fastener pattern for securing the electrical device within a junction box. The clearance recesses 137 permit the substrate 130 to abut the yoke of the electrical device.

The subplate 102 has outboard tabs 138 extending outwardly from an upper edge of the substrate 130. The subplate likewise has outboard tabs 140 extending outwardly from a lower edge of the substrate 130. The upper outboard tabs 138 and the lower outboard tabs 140 may be angled relative to the substrate 130 such that they extend from the substrate 130 outwardly and away from the substrate 130 and electrical device 110 and towards the cover plate 104.

The subplate 102 also has an upper inboard tab 142 and a lower inboard tab 144. The upper and lower inboard tabs 142, 144 are positioned along a centerline or longitudinal axis of subplate 102, and extend outwardly from the substrate 130. The tabs 142, 144 may be angled relative to the substrate 130 such that they extend from the substrate 130 outwardly and away from the substrate 130 and electrical device 110 and towards the cover plate 104.

In a further example, the subplate 102 is provided with only the upper outboard tabs 138 and a lower inboard tab 144.

Figure 1:
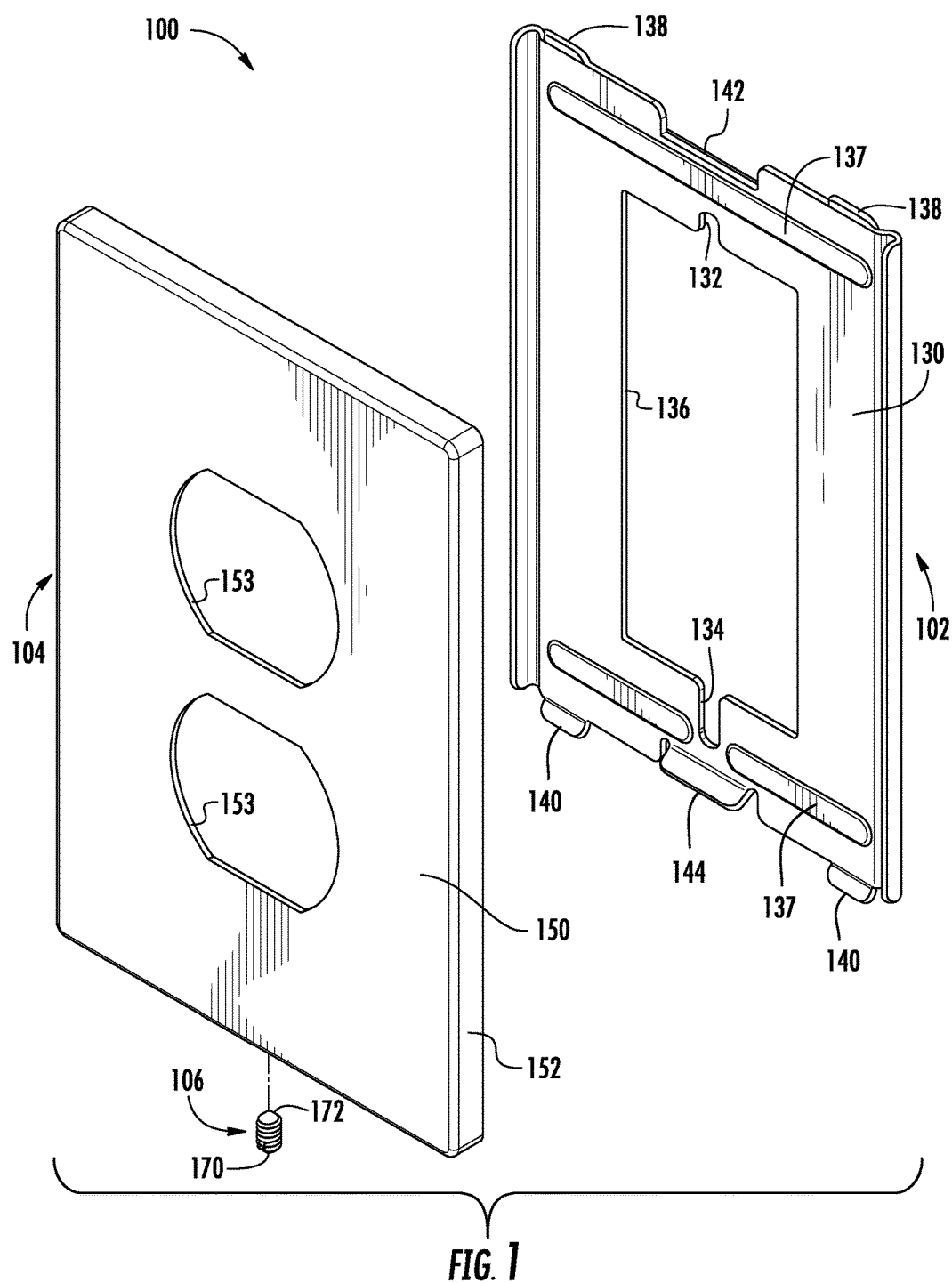
FIG. 1 is an exploded perspective view of a cover plate assembly according to an embodiment.
Figure 3:
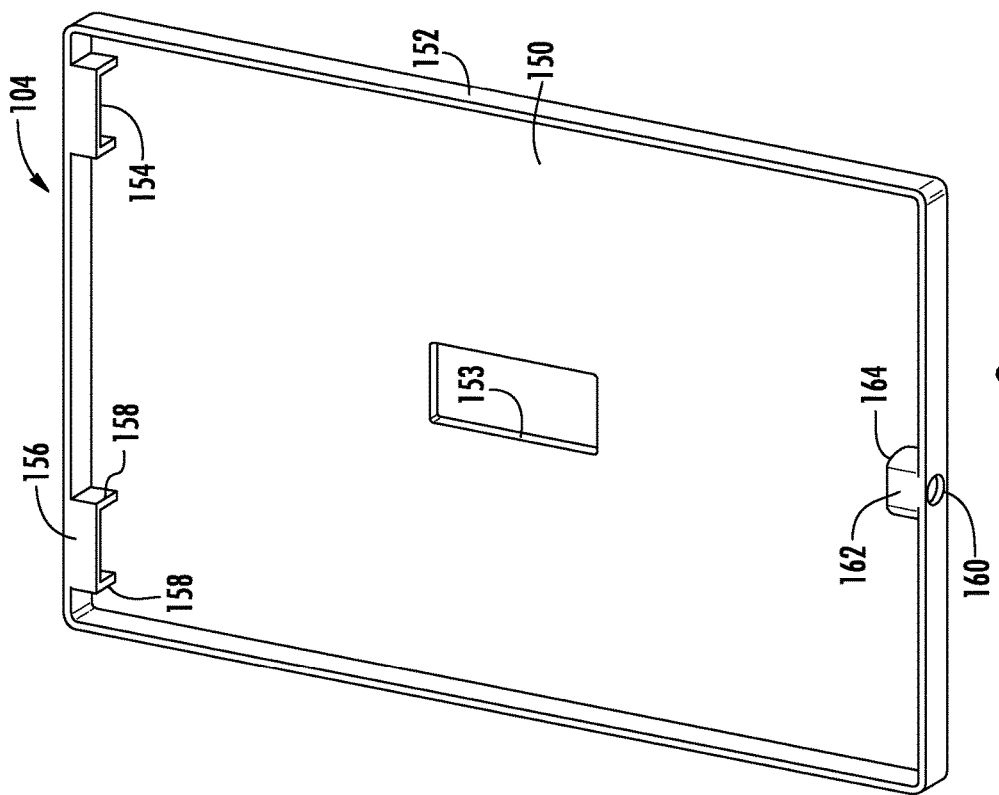
FIG. 3 is a rear perspective view of a cover plate for the cover plate assembly of FIG. 1.
Figure 2:
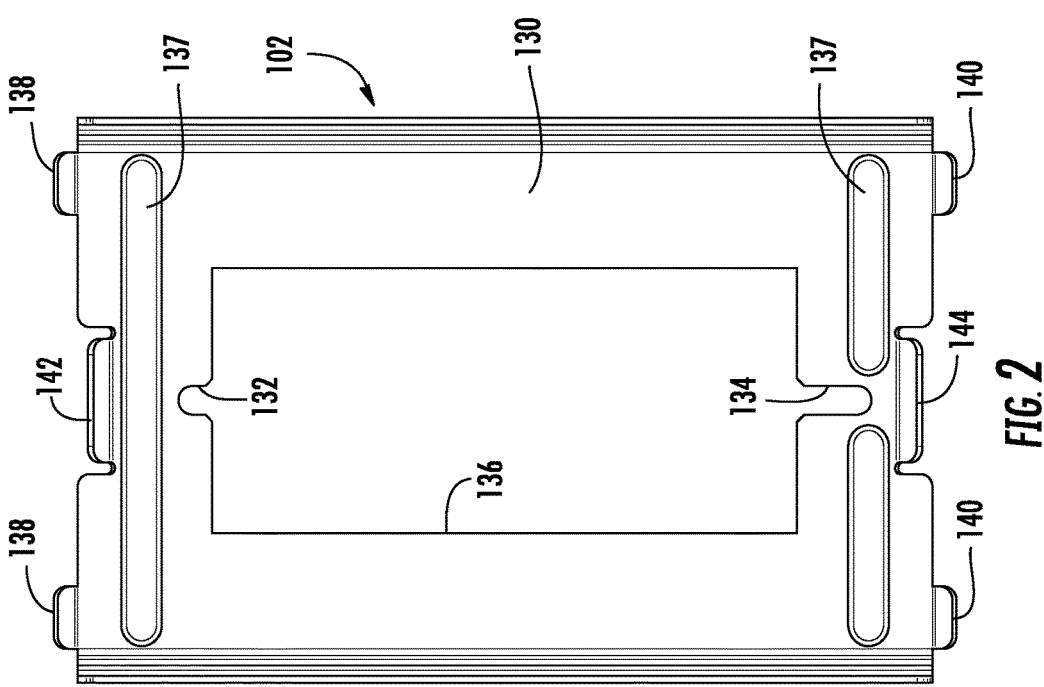
FIG. 2 is an elevation view of a subplate for the cover plate assembly of FIG. 1.

The cover plate assembly 100 also includes a decorative cover plate 104 for covering the subplate 102. The cover plate 104 also has a substrate 150 that is sized to be mounted upon the subplate substrate 130. A peripheral rim 152 extends from the cover plate substrate 150 for engaging the wall 112 and concealing the subplate 102. The cover plate 104 may also include one or more access openings 153 for access to the electrical device 110. The access openings 153 are shaped and sized based on the type of electrical device 110 that the cover plate assembly 100 is intended to be used with. In FIG. 1, the access openings 153 are shaped for use with an electrical outlet. In FIG. 3, the access opening 153 is shaped for use with a toggle style switch. In another example, the access openings may be replaced by a fitting, connector, jack, or the like. In another example, the cover plate 104 may be a blank cover plate without access openings 153.

The cover plate 104 may likewise be fabricated of a pre-galvanized stamped steel, or may be formed from a zinc or zinc alloy or other materials. The cover plate 104 may be formed with an outer surface having various decorative profiles, embossings, and the like. Additionally, the outer surface of the cover plate may be finished via a plating process, powder coat process, painting, and the like to provide a desired surface finish and color.

The cover plate 104 defines slots 154. Each slot 154 may be defined by a base member 156 extending from an edge region of the peripheral rim 152, and a pair of side members 158 connecting the base member 156 to the substrate 150 of the cover plate 104. The slots 154 are positioned and spaced to cooperate with a set of the outboard tabs 138, 140 of the subplate to locate and retain the cover plate relative to the subplate. In alternative embodiments, the slots may be defined by the subplate 102 and the outboard tabs may be defined by the cover plate 104.

The cover plate 104 also defines a threaded aperture 160 that intersects an outer surface of the peripheral rim 152. A support member 162 extends inwardly from the peripheral rim to an end face 164 and provides additional structure for the threads and support for the threaded aperture 160. The threaded aperture 160 also intersects an inner end face 164 of the member 162. As shown in FIG. 3, a surface of the base members 156 and the support member 162 may be co-planar with an edge of the peripheral rim, and contact the wall 112 when the cover plate assembly 100 is installed on a device 110.

The support member 162 and the threaded aperture 160 are positioned to be aligned with the inboard tabs 142, 144 of the subplate 102.

The threaded fastener 106 extends from a first end 170 to a second end 172. The first end 170 has a head defining a slot or other recessed shape to cooperate with a driving bit on a tool. The second end 172 has an end face that may be planar or provided with rounded or other shape. The fastener is threaded between the first and second ends and the threads of the fastener are sized to mate and cooperate with the threaded aperture of the cover plate. The threaded fastener 106 may be generally cylindrical in shape such that the first and second ends of the fastener 106 have the same diameter or a similar diameter as one another.

When the threaded fastener 106, or set screw, is positioned within the threaded aperture 160, the first end 170 of the threaded fastener is flush with the peripheral edge 152 or is inset slightly. The second end 172 of the threaded fastener extends through the aperture 160, past the end face 164, and contacts and engages a surface of the inboard tab 144, such that the inboard tab 144 is positioned between the second end 172 of the fastener and the substrate 150 of the cover plate.

Therefore, one set of the outboard tabs 138, 140 and the slots 154 cooperate with one another, and the threaded fastener 106 cooperates with an associated inboard tab 142, 144 to fasten the cover plate 104 to the subplate 102. Once installed, fasteners 118 for the mounting strap, and apertures 122 for fasteners that would be used with a conventional cover plate are concealed.

Figure 7:
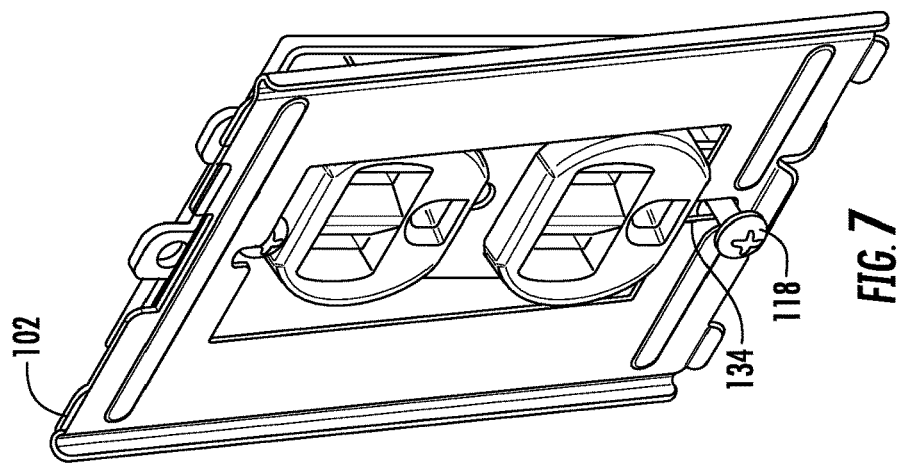
FIG. 7 is a perspective view of the subplate of the cover plate assembly of FIG. 1 during installation onto the device of FIG. 6.

FIGS. 6-13 illustrate the cover plate assembly 100 during various stages of installation onto the wall mounted electrical device 110. As previously described, FIG. 6 illustrates an embodiment of a wall mounted electrical device 110. In FIG. 7, the fastener 118 connecting the mounting strap 116 of the electrical device to the box 114 via the upper aperture is removed or loosened, and the fastener 118 connecting the mounting strap 116 of the electrical device to the box 114 via to the lower aperture is loosened such that the head of the fasteners 118 are spaced apart from the mounting straps 116. The lower slot 134 of the subplate 102 is aligned with and translated with respect to the lower fastener 118 for the lower aperture and mounting strap.

Figure 8:
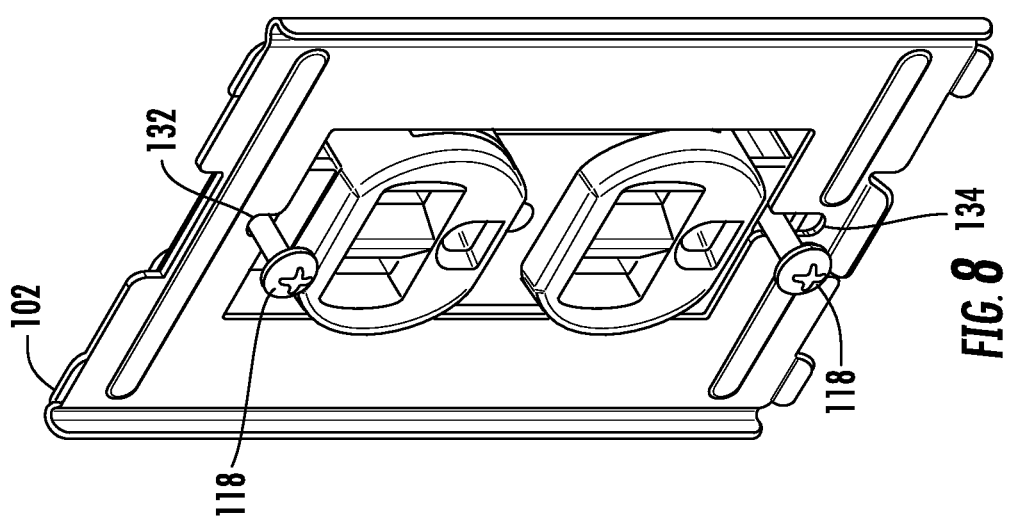
FIG. 8 is a perspective view of the subplate of the cover plate assembly of FIG. 1 during installation onto the device of FIG. 6.

In FIG. 8, the subplate 102 is rotated to lay against the surrounding wall surface 112, and with the upper slot 132 aligned with the upper aperture and fastener 118. If the slots 132, 134 of the subplate have different lengths, the fasteners 118 associated with apertures may each be loosened and the subplate 102 may be fit over the fasteners 118 such that the subplate 102 hangs on the upper fastener 118 as shown in FIG. 8. If the slots 132, 134 are the same length, one of the fasteners 118 is loosened and the other fastener 118 is removed when connecting the subplate 102. Once the subplate 102 is positioned relative to the electrical device 110 as shown in FIG. 8, the fasteners 118 are rethreaded into apertures, such that the fasteners 118 retain both the electrical device 110 and the subplate 102 to the mounting straps 116 of the electrical device 110.

Figure 11:
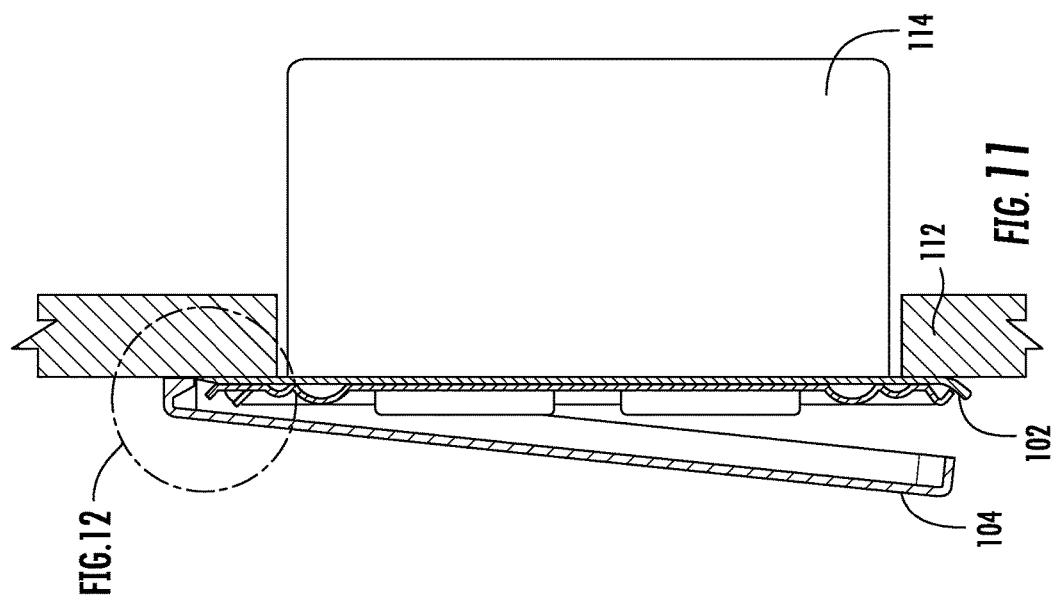
FIG. 11 is a sectional view of the cover plate assembly of FIG. 10 during installation onto the device of FIG. 6.
Figure 10:
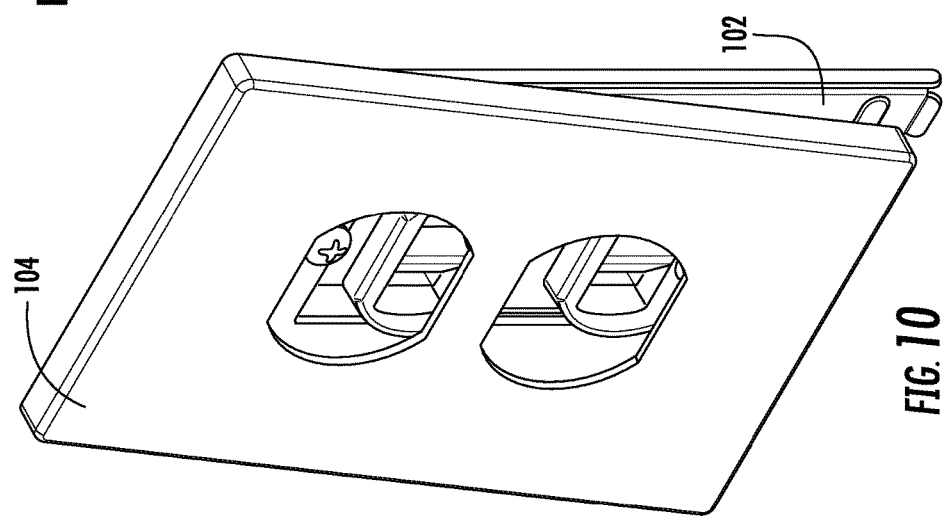
FIG. 10 is a perspective view of the cover plate during installation onto the subplate of FIG. 1 and the device of FIG. 6.

In FIGS. 10 and 11, the cover plate 104 is positioned over the subplate 102. The cover plate 104 may be positioned such that the aperture 160 on the peripheral edge 152 is generally hidden or not apparent to a person, e.g. facing downward for an electrical device 110 that is near the floor or below an average eye height, or facing upward for an electrical device 110 that is near the ceiling or above an average eye height.

Figure 12:
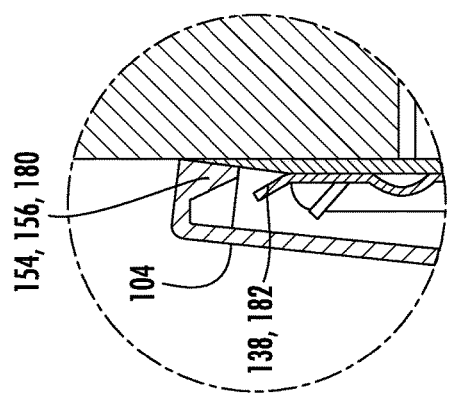
FIG. 12 is an enlarged sectional view of FIG. 11 of the cover plate assembly of FIG. 10 during installation onto the device of FIG. 6.

As shown in FIG. 11, the outboard tabs 138 are positioned within the respective slots 154 in the cover plate 104. The base member 156 defining the slot 154 may be provided with an angled wall 180 facing the slot 154 that is shaped to cooperate with the angled surface 182 of the outboard tab 138, as shown in FIG. 12.

Figure 13:
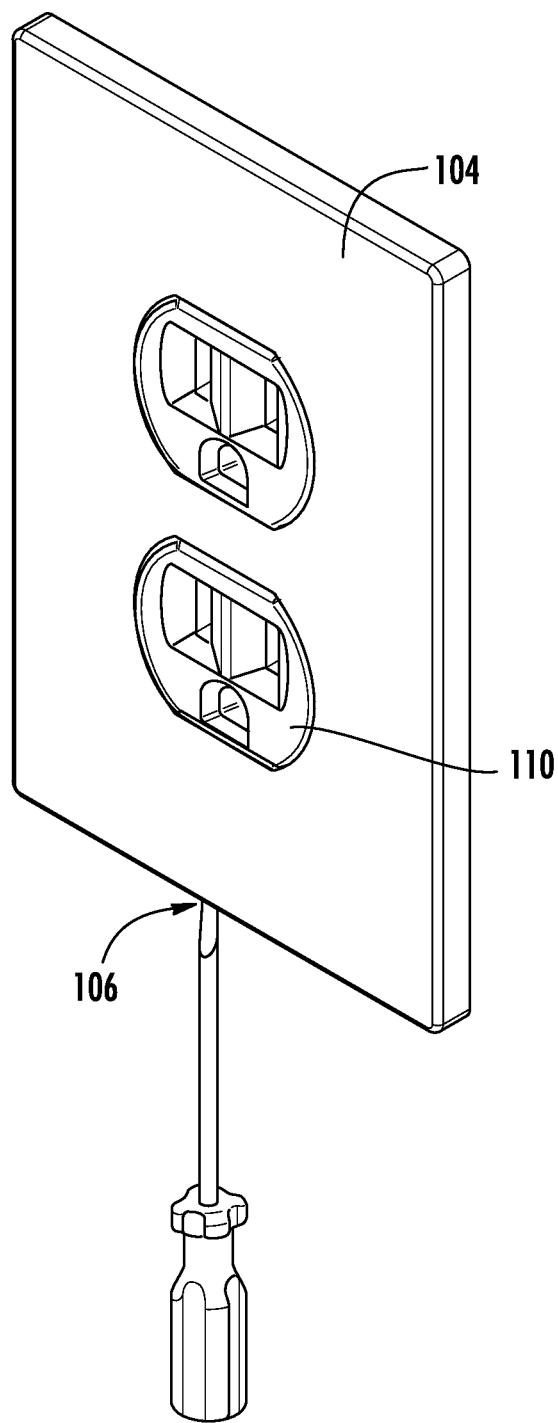
FIG. 13 is a perspective view of the cover plate during installation onto the subplate of FIG. 1 and the device of FIG. 6.

In FIG. 13, the cover plate 104 is positioned to lie against the adjacent wall surface 112, and the fastener 106 is threaded into the aperture 160 until the second face 172 is in contact with the inboard tab 144 and the first face 170 or head is generally flush with the peripheral edge 152 of the cover plate 104.

Figure 14:
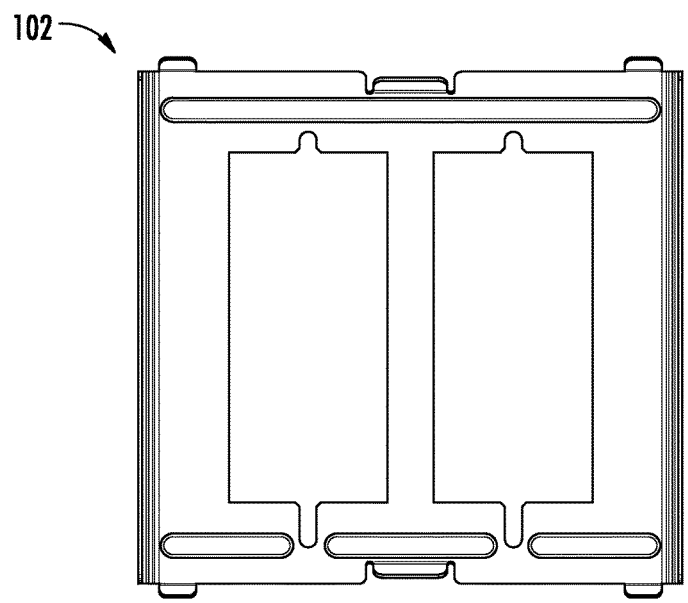
FIG. 14 is an elevation view of a subplate for a cover plate assembly according to another embodiment.
Figure 15:
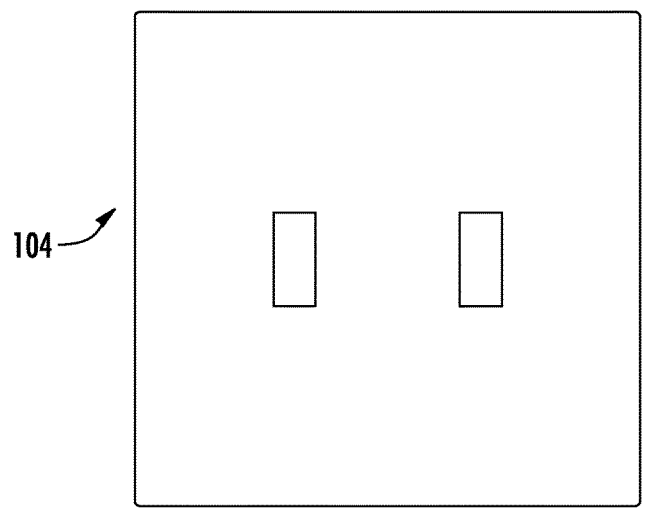
FIG. 15 is an elevation view of a cover plate for use with the subplate of FIG. 14.
Figure 16:
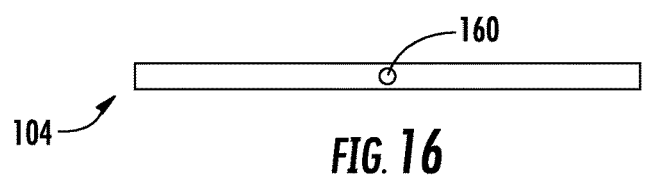
FIG. 16 is an elevation view of the cover plate of FIG. 15.

The cover plate assembly 100 may have various shapes and sizes for use with different electrical devices. Various embodiments are shown as non-limiting examples of cover plate assemblies that attach to the wall mounted electrical device as descried above with respect to FIGS. 6-13. These figures do not depict every embodiment; rather are included to illustrate the arrangements for common electrical devices. FIGS. 2-5 illustrate an example of a single gang cover plate assembly for a toggle switch. FIGS. 14-16 illustrate an example of a double gang cover plate assembly for a toggle switch. As can be seen in the figures, a single threaded aperture 160 and corresponding fastener is used to connect the cover plate to the subplate in FIGS. 1-5 and 14-16.

Figure 17:
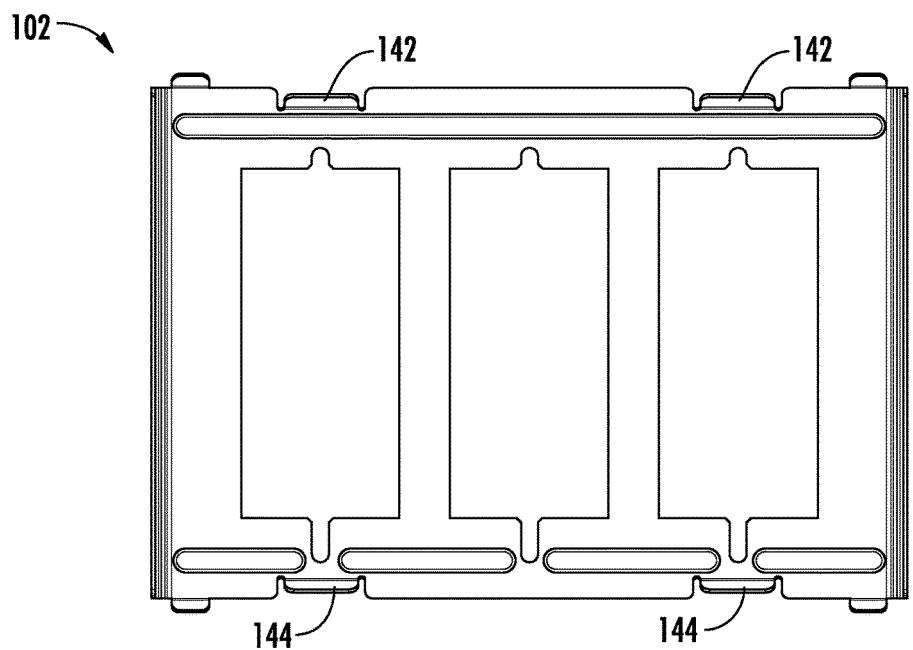
FIG. 17 is an elevation view of a subplate for a cover plate assembly according to another embodiment.
Figure 18:
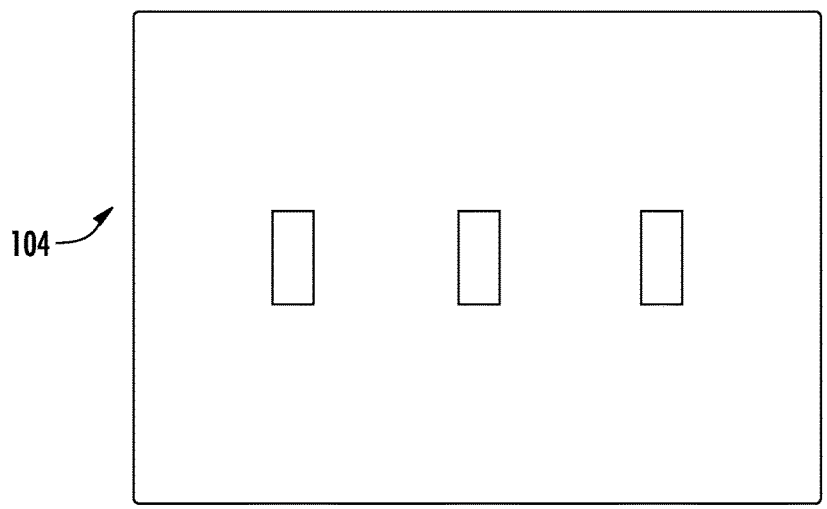
FIG. 18 is an elevation view of a cover plate for the subplate of FIG. 17.
Figure 19:
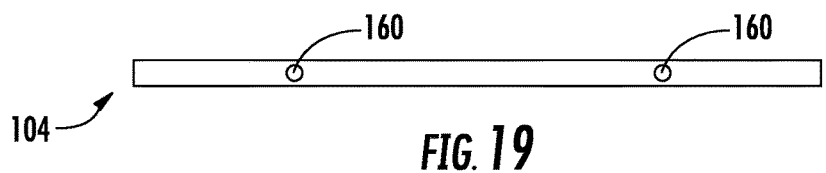
FIG. 19 is an elevation view of the cover plate of FIG. 17.
Figure 20:
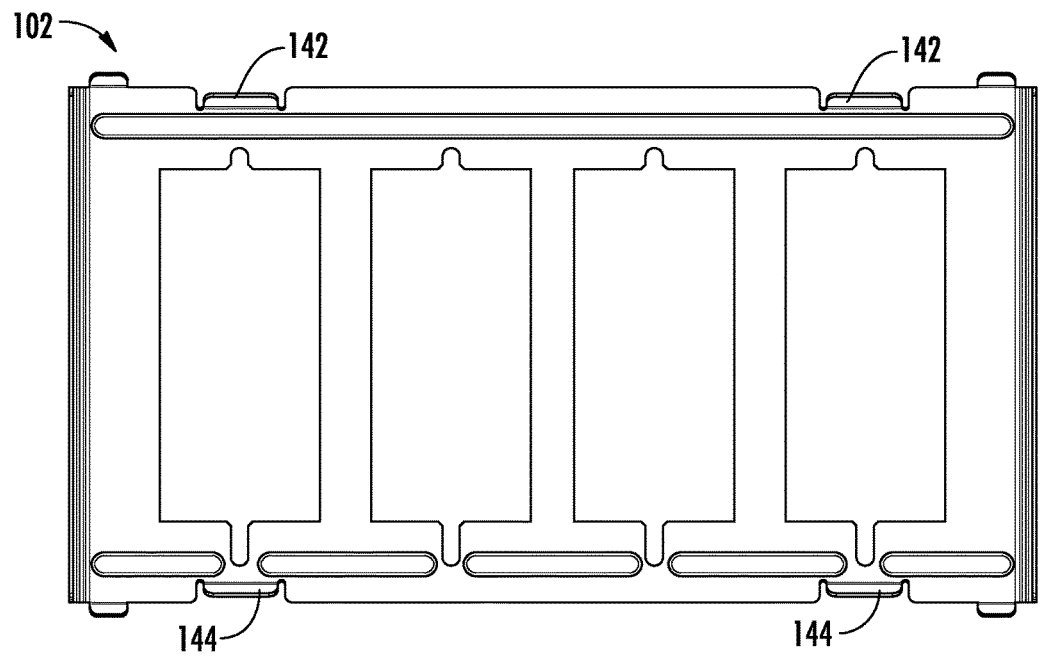
FIG. 20 is an elevation view of a subplate for a cover plate assembly according to another embodiment.
Figure 21:
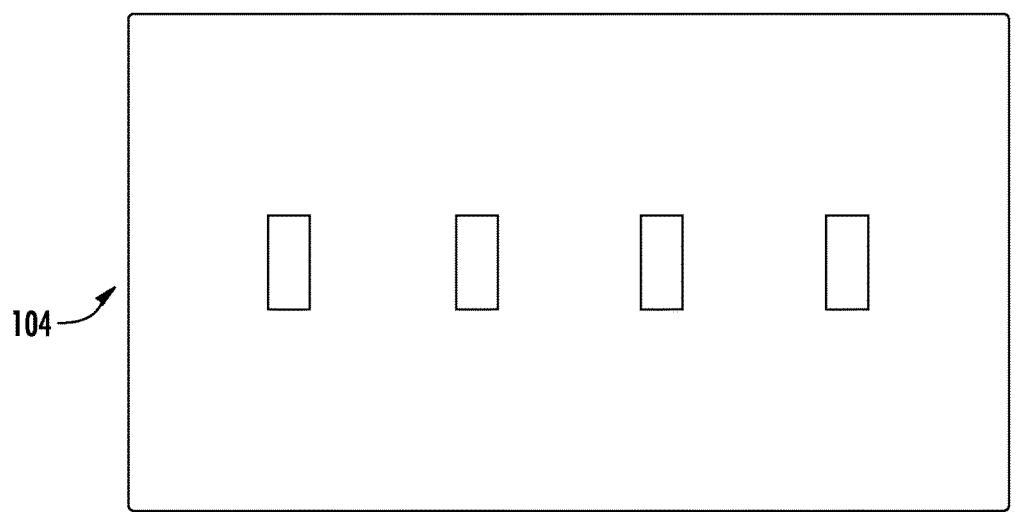
FIG. 21 is an elevation view of a cover plate for the subplate of FIG. 20.
Figure 22:
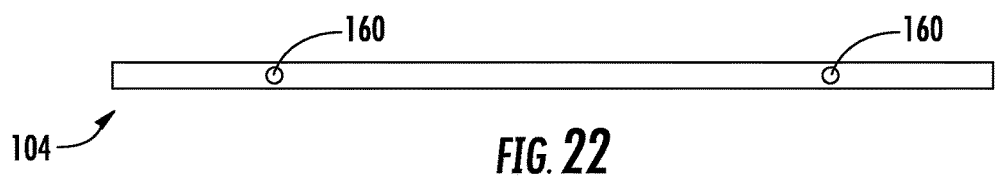
FIG. 22 is an elevation view of the cover plate of FIG. 21.

FIGS. 17-19 illustrate an example of a triple gang cover plate assembly for a toggle switch. FIGS. 20-22 illustrate an example of a quad or four gang cover plate assembly for a toggle switch. As can be seen in the figures, the subplate 102 defines two inboard tabs 142, 144 on each side, and the cover plate 104 defines two threaded apertures 160 such that two threaded fasteners 106 are used to connect the cover plate 104 to the subplate 102 in FIGS. 17-22.

Figure 23:
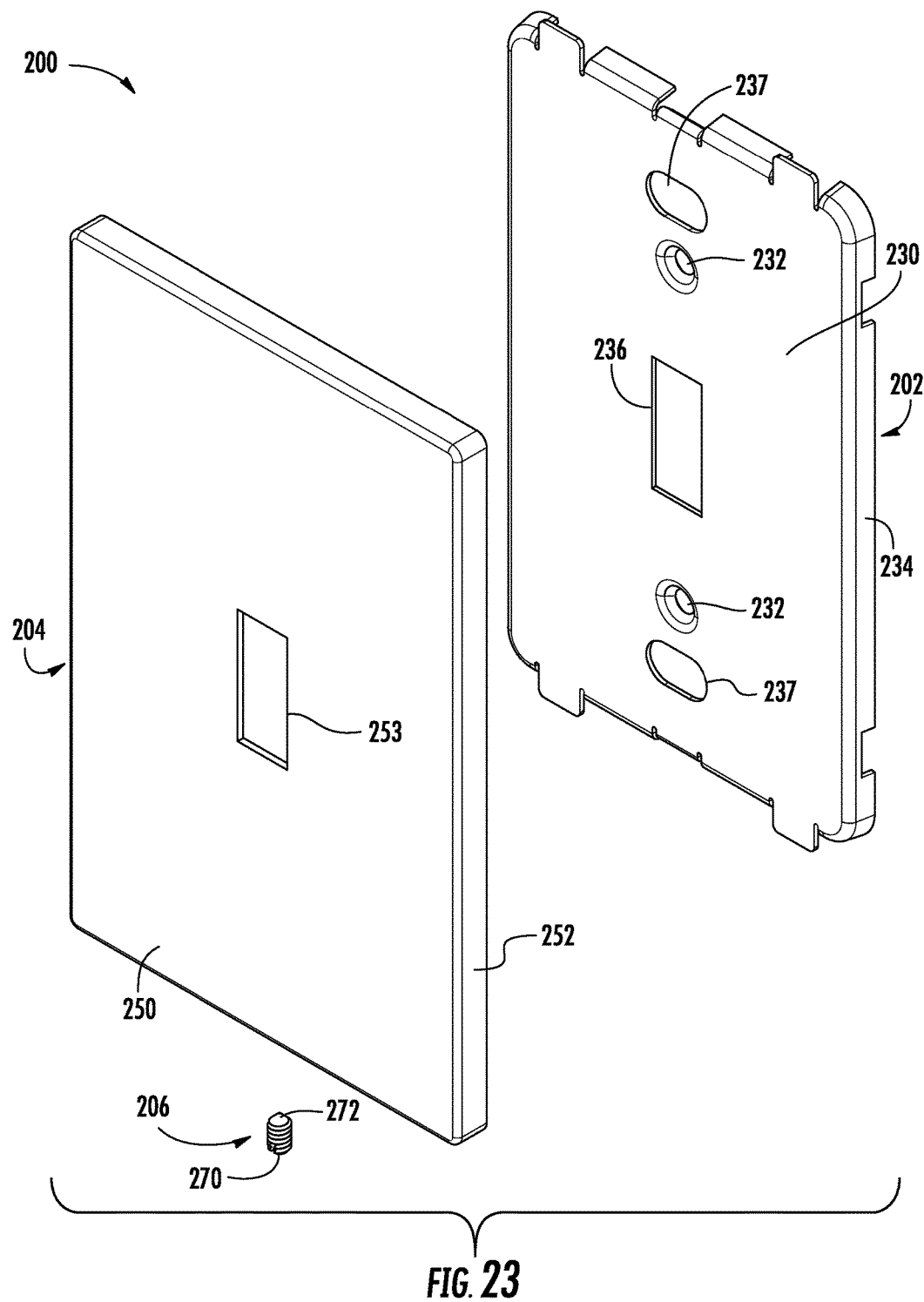
FIG. 23 is an exploded perspective view of a cover plate assembly according to an embodiment.
Figure 25:
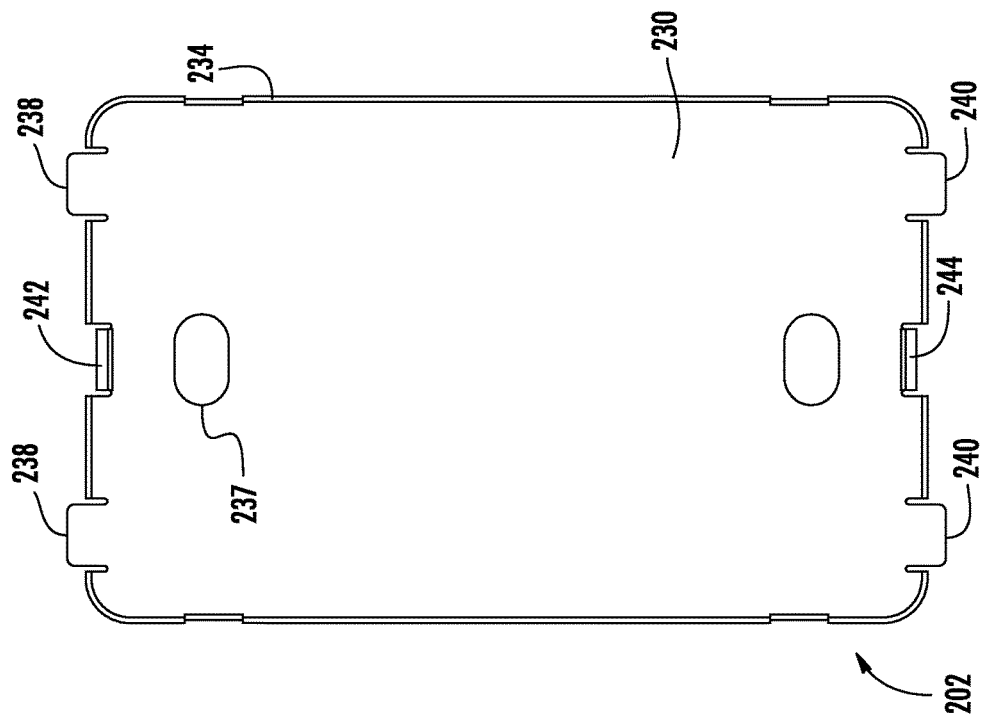
FIG. 25 is an elevation view of the subplate for the cover plate assembly of FIG. 23.
Figure 24:
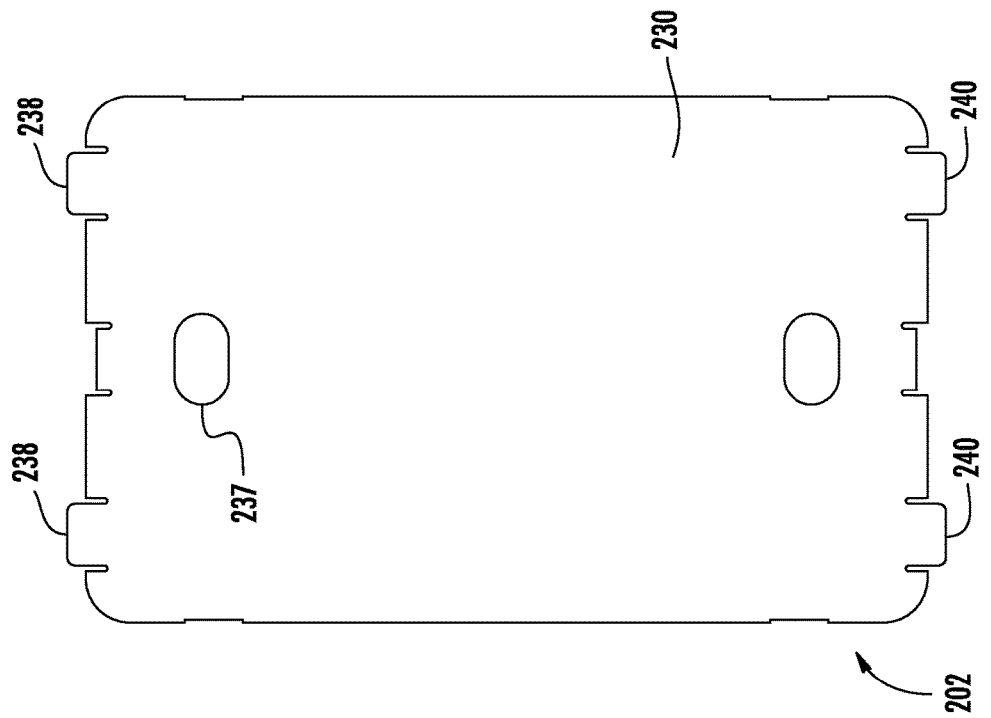
FIG. 24 is an elevation view of a subplate of the cover plate assembly of FIG. 23.
Figure 29:
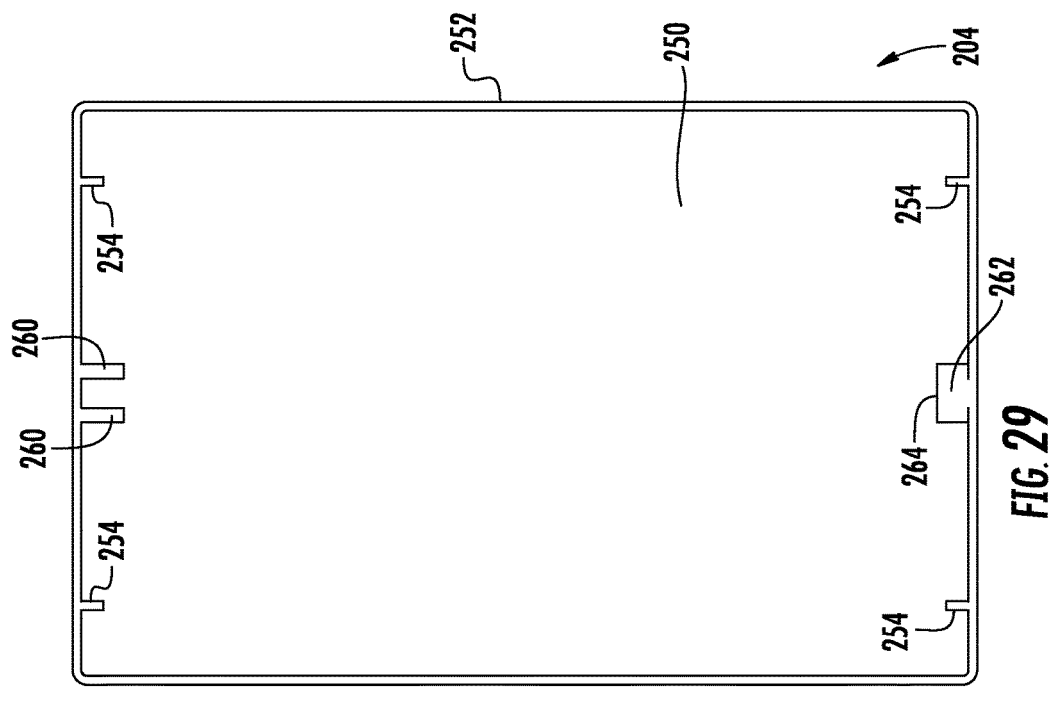
FIG. 29 is an elevation view of the cover plate for the cover plate assembly of FIG. 23.
Figure 28:
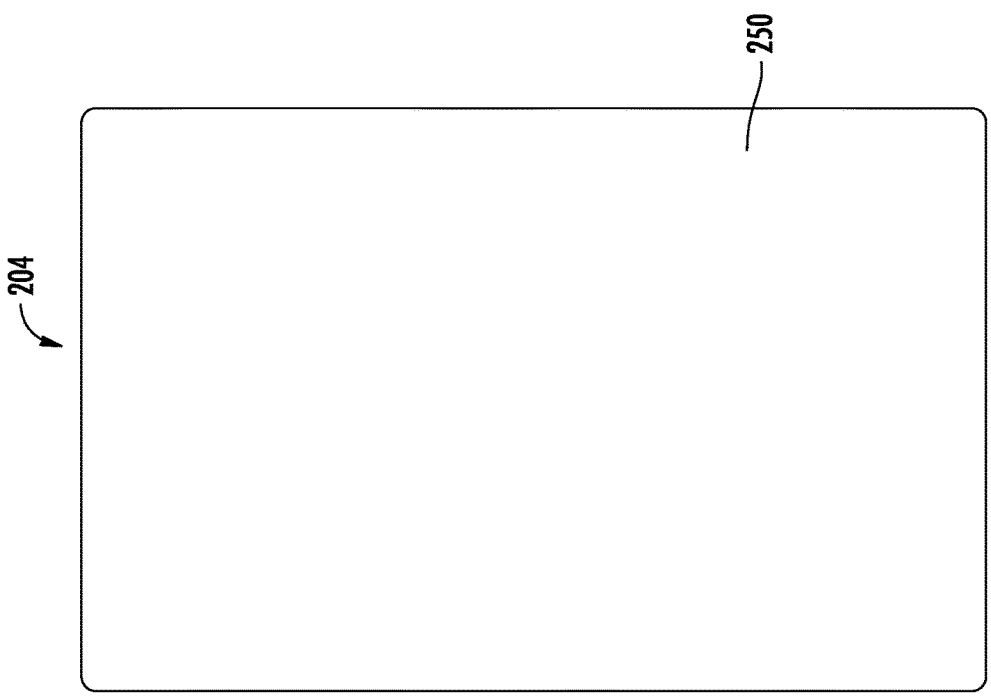
FIG. 28 is an elevation view of a cover plate for the cover plate assembly of FIG. 23.
Figure 30:
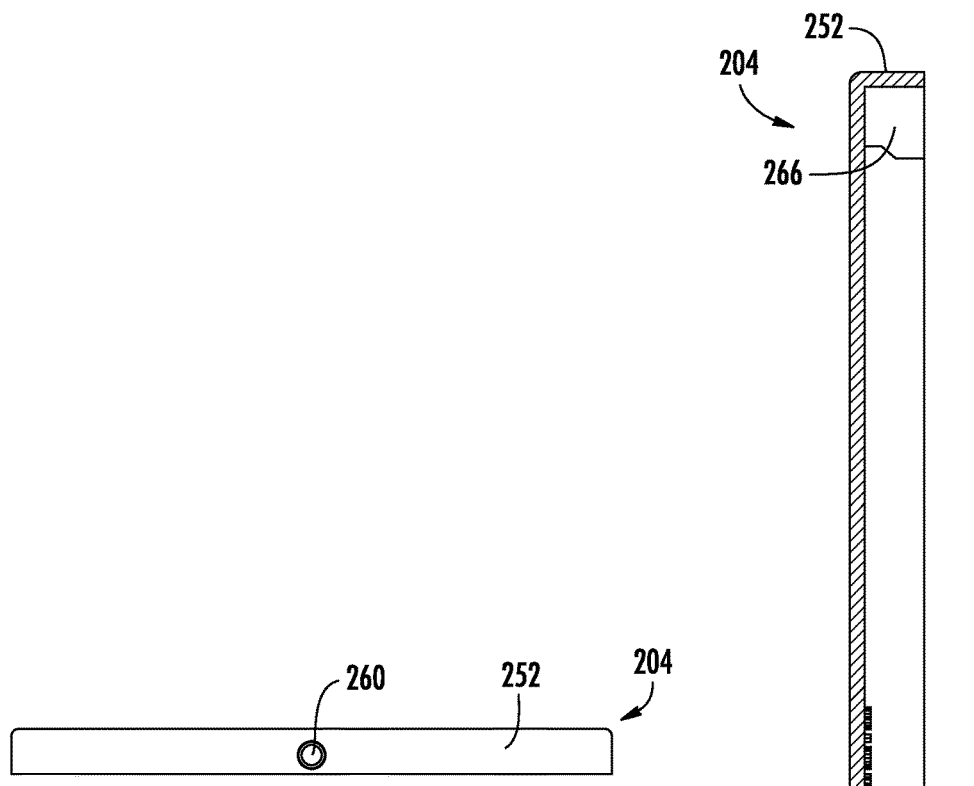
FIG. 30 is an elevation view of the cover plate for the cover plate assembly of FIG. 23.

FIG. 23 illustrates a cover plate assembly 200 according to another embodiment for covering and enclosing a wall mounted electrical device, such the device 110 shown in FIG. 6. For example, the cover plate assembly 200 is depicted to enclose and cover a box for an electrical device 110 having a single toggle switch. In other examples, the cover plate assembly 200 may be configured for use with other electrical devices. The assembly 200 has a subplate 202, a cover plate 204, and a fastener such as a set screw 206.

The subplate 202 is shown in FIGS. 23-27. FIG. 27 is an enlarged partial view of the lower edge of FIG. 26. The subplate 202 is provided with a substrate 230 that is adapted to be mounted to the electrical device 110 for enclosing the electrical device 110. The substrate 230 includes one or more apertures 232 for receipt of heads of threaded fasteners for fastening the subplate 102 to the threaded aperture(s) 122 on the yoke 120 of the electrical device 110. FIG. 23 illustrates that the subplate 202 has two apertures 232 that are sized and spaced to correspond with the fastener pattern 122 for a conventional single switch cover plate. The apertures 232 may be oriented in any suitable pattern associated with a fastener pattern for a conventional cover plate of an electrical device 110, e.g., aperture(s) 12 on the yoke 120 of the device. In FIGS. 24-27, the subplate 202 is shown prior to forming apertures.

A height and a width of the subplate 202 are sized to effectively cover a standard electrical wall box 114 opening. As the subplate 202 is installed over the mounting straps 116 and associated fasteners 118 of the device 110, a peripheral rim 234 may be provided on the substrate 230 to cooperate with the substrate 230 to enclose the box 114 and device 110. The substrate 230 also includes access openings 236 for access to the electrical device 110. FIG. 23 illustrates that the subplate 202 has one access opening 236 for a single switch electrical device. The access openings 236 may be formed in any suitable size and shape for use with various electrical devices as are known in the art. In FIGS. 24-27, the subplate 202 is shown prior to forming access openings 236, and may be provided for use with a blank cover plate assembly.

The subplate 202 can be fabricated of a pre-galvanized stamped steel in order to meet corrosion resistance requirement of Underwriters Laboratories Standard UL514D (Cover Plates for Flush-Mounted Wiring Devices). The access openings 236 within the substrate 230 of the subplate 202 are utilized to make adjustments of the electrical devices. The overall size of the subplate 202 and the apertures are sized and designed to meet National Electrical Manufacturers Association (NEMA) standard WD6 which covers Wiring Device Dimensional Specifications. Typically, the access openings 236 are fitted for standard toggle switches, antique push button switches, duplex devices and Ground Fault Circuit Interrupter (GFCI) receptacles, other switches, outlets, and cables as described above, and the like.

The substrate may additionally form clearance openings 237 positioned to correspond with fasteners 118 in the mounting straps 116 of the electrical device 110. The substrate 230 of the subplate 102 may form these clearance apertures 237 to be aligned with the fastener pattern for securing the electrical device 110 within a junction box 114.

The clearance apertures 237 permit the substrate 230 to abut the yoke 120 of the electrical device 110.

The subplate 202 has outboard tabs 238 extending outwardly from an upper edge of the substrate 230. The subplate likewise has outboard tabs 240 extending outwardly from a lower edge of the substrate 230. The upper outboard tabs 238 and the lower outboard tabs 240 may be generally co-planar with the substrate 230 such that they extend from the substrate 230 outwardly and away from the substrate 230.

The subplate 202 also has an upper inboard tab 242 and a lower inboard tab 244. The upper and lower inboard tabs 242, 244 are positioned along a centerline or longitudinal axis of subplate 202, and extend outwardly from the substrate 230, and are angled to extend towards one another. In one example, the tabs 242, 244 are angled 40-60 degrees, or 50 degrees, relative to the substrate 230. A side view of the lower tab 244 is illustrated in FIG. 27. The tabs 242, 244 may be angled relative to the substrate 230 such that they extend from the substrate 230 outwardly and away from the substrate 230 and cover plate 204, and towards the electrical device 110 and one another.

The cover plate assembly 200 also includes a decorative cover plate 204 for covering the subplate 202. The cover plate 204 also has a substrate 250 that is sized to be mounted upon the subplate substrate 230. A peripheral rim 252 extends from the cover plate substrate 250 for engaging the wall and concealing the subplate 202. The cover plate 204 may also include one or more access openings 253 for access to the electrical device 110. The access openings 253 are shaped and sized based on the type of electrical device 110 that the cover plate assembly 200 is intended to be used with. In FIG. 23, the access opening 253 are shaped for use with a single toggle switch. In another example, the access openings may be shaped for use with an electrical outlet, fitting, connector, jack, or the like. In FIGS. 28-34, an example of the cover plate 204 is illustrated prior to forming the access openings 253, or for use as a blank cover plate without access openings 253.

The cover plate 204 may likewise be fabricated of a pre-galvanized stamped steel, or may be formed from a zinc or zinc alloy, or other materials. The cover plate 204 may be formed with an outer surface having various decorative profiles, embossings, and the like. Additionally, the outer surface of the cover plate may be finished via a plating process, powder coat process, painting, and the like to provide a desired surface finish and color.

The cover plate 204 defines guides or ribs 254. Each rib 254 extends inwardly along an inner surface of the substrate 250 from the peripheral rim 252. The ribs 254 are positioned and spaced to cooperate with the outboard tabs 238, 240 of the subplate to locate the cover plate relative to the subplate.

Figure 31:
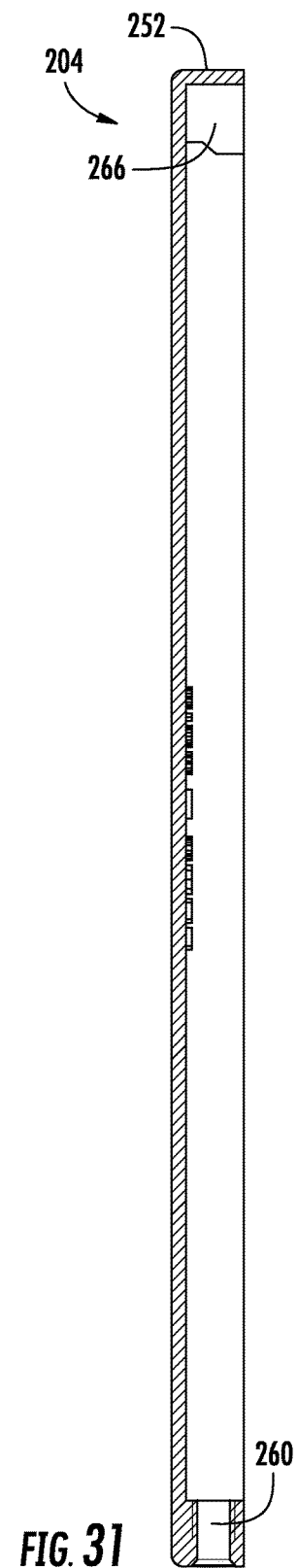
FIG. 31 is a sectional view of the cover plate for the cover plate assembly of FIG. 23.
Figure 32:
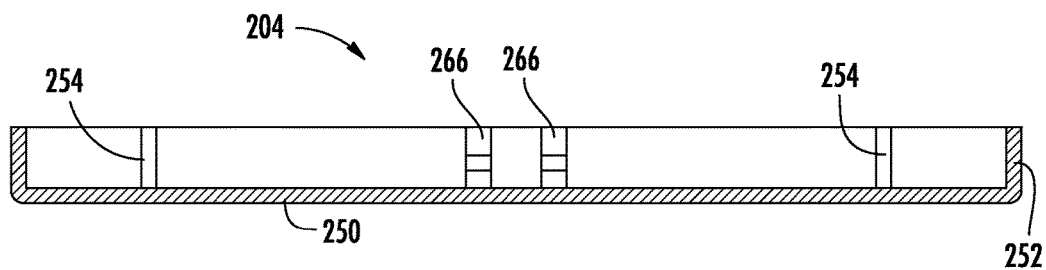
FIG. 32 is a sectional view of the cover plate for the cover plate assembly of FIG. 23.
Figure 33:
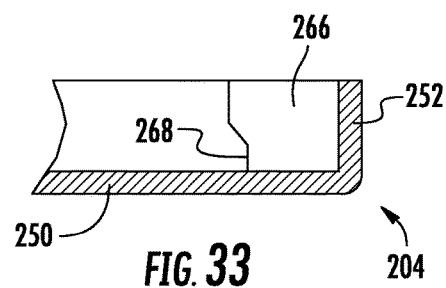
FIG. 33 is an enlarged sectional view of the cover plate as shown in FIG. 31.
Figure 34:
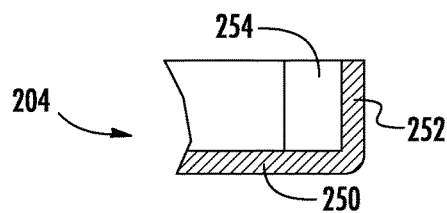
FIG. 34 is an enlarged sectional view of the cover plate for the cover plate assembly of FIG. 23.

The cover plate 204 also defines a threaded aperture 260 that intersects an outer surface of the peripheral rim 252. A support member 262 extends inwardly from the peripheral rim to an end face 264 and provides additional support for the threaded aperture 260. The threaded aperture 260 also intersects the end face 264 of the member 262. As shown in FIG. 31, a surface of the support member 262 may be co-planar with an edge of the peripheral rim, and contact the wall when the cover plate assembly 200 is installed on a device 110.

The support member 262 and the threaded aperture 260 are positioned to be aligned with the inboard tabs 242, 244 of the subplate.

Figure 36:
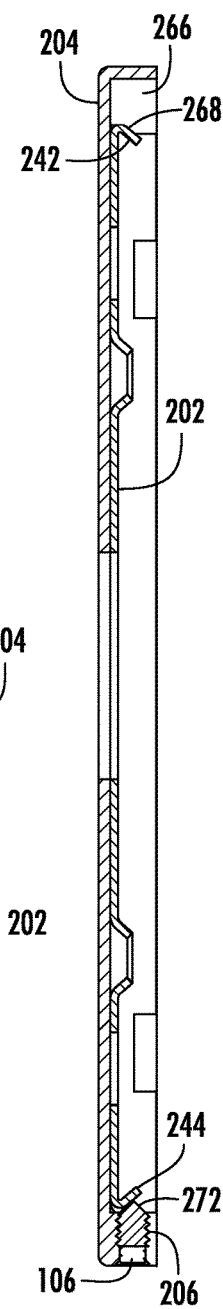
FIG. 36 is a sectional view of the cover plate assembly of FIG. 23 in an assembled configuration.
Figure 37:
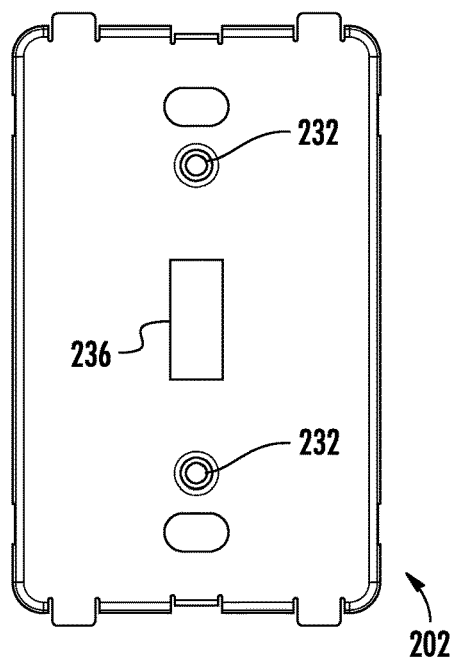
FIG. 37 is an elevation view of a subplate for a cover plate assembly according to an embodiment.
Figure 38:
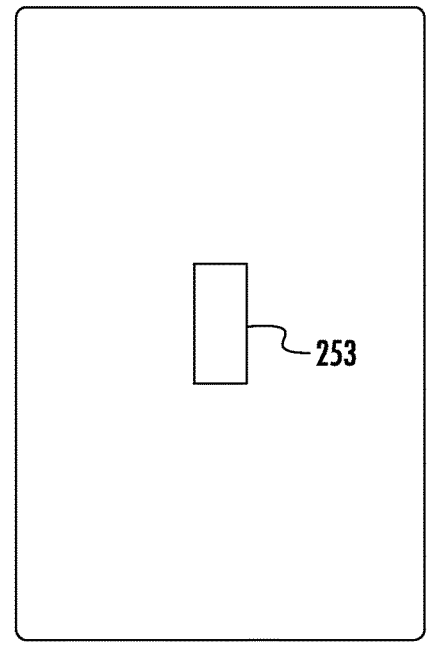
FIG. 38 is an elevation view of a cover plate for use with the subplate of FIG. 37.

The cover plate 204 also forms ribs 266 or another similar structure that is sized similarly to the support member 262 to be aligned with the inboard tabs 242, 244 of the subplate. The ribs 266 and support member 262 fit within a recessed space along the edge of the substrate of the subplate to be directly above or below the inboard tabs 242, 244. The ribs 266 may have an angled edge 268 that cooperated with an angled surface of a tab 242 as shown in FIG. 36.

The threaded fastener 206 extends from a first end 270 to a second end 272. The first end 270 has a head defining a slot or other recessed shape to cooperate with a driving bit on a tool. The second end 272 has an end face that may be planar or provided with an angularly tapered, rounded or other shape. The fastener 206 is threaded between the first and second ends 270, 272 and the threads of the fastener are sized to mate and cooperate with the threaded aperture 260 of the cover plate 204. The threaded fastener 206 may be generally cylindrical in shape such that the first and second ends 270, 272 of the fastener 206 have the same diameter or a similar diameter as one another.

When the threaded fastener 206, or set screw, is positioned within the threaded aperture 260, the first end 270 of the threaded fastener is flush with the peripheral edge 252 or is inset slightly. The second end 272 of the threaded fastener extends through the aperture 260, past the end face 264, and contacts and engages a surface of the inboard tab 244, such that the inboard tab 244 is positioned between the second end 272 of the fastener and the cover plate 204, as shown in FIG. 36.

Therefore, a set of the outboard tabs 238, 240 and the ribs 254 cooperate with one another, and the threaded fastener 206 cooperates with the inboard tab 244 to fasten the cover plate 204 to the subplate 202. Once installed, fasteners 118 for the mounting strap, and apertures 122 for fasteners that would be used with a conventional cover plate are concealed.

Figure 35:
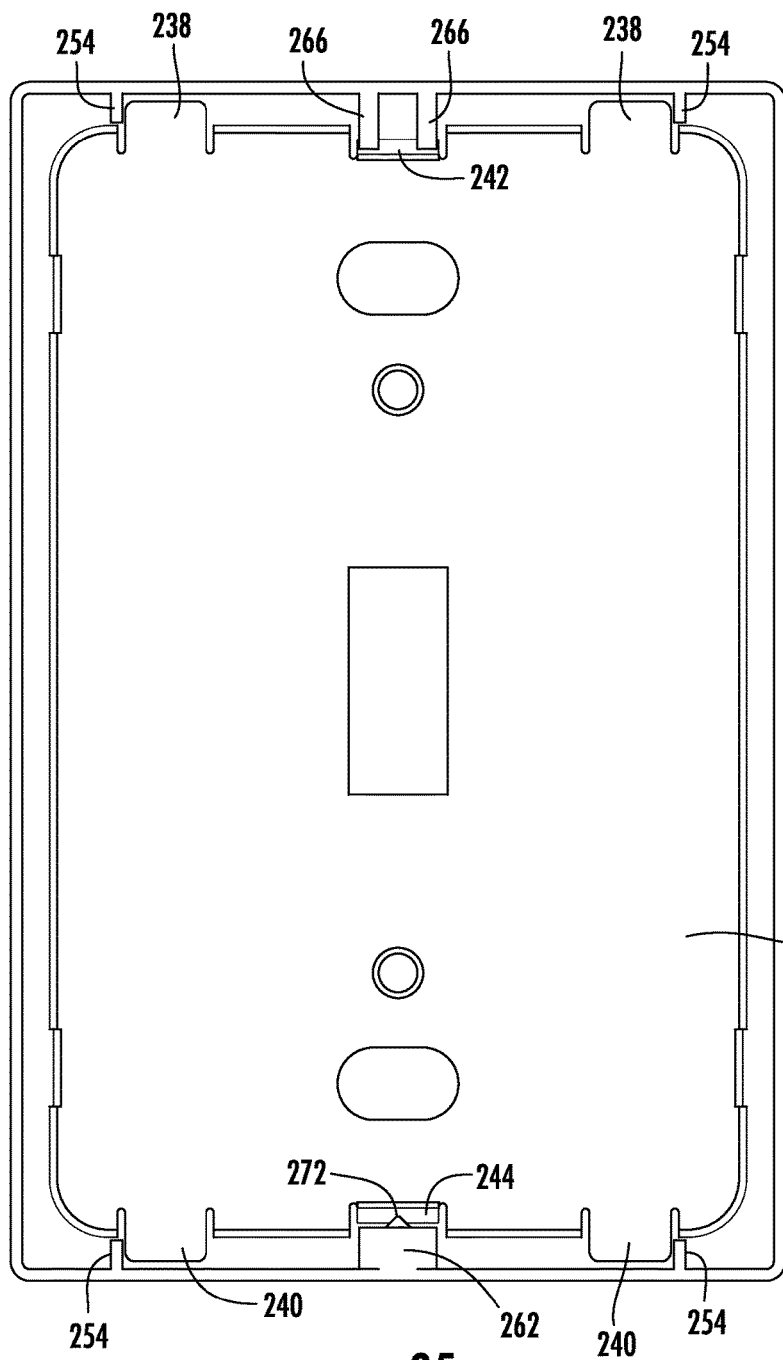
FIG. 35 is an elevation view of the subplate and the cover plate of the cover plate assembly of FIG. 23 in an assembled configuration.

The cover plate assembly 200 is illustrated in an assembled configuration in FIGS. 35-36. For installation, a fastener, for connecting a conventional cover plate to the electrical device via aperture 122 is removed. The subplate 202 is connected to the electrical device 110 by inserting the fasteners for apertures 122 through corresponding apertures 232 in the subplate 202 and into the threaded aperture 122 of the electrical device. In this installation, the fasteners 118 for the mounting strap 116 of the electrical device are therefore not loosened or removed.

The cover plate 204 is positioned over the subplate 202 and located relative to the subplate via cooperation between the ribs 254 and the outboard tabs 238, 240. The cover plate 204 may hang on the upper tab 242 via the angled edges 268 on ribs 266. The angled edges 268 on the ribs 266 additionally cooperate with the angled surface upper tab 242 to retain the cover plate 204 against the wall surface 112. The cover plate 204 may be positioned such that the aperture 260 on the perimeter is generally hidden or not apparent to a person, e.g. facing downward for an electrical device that is near the floor or below an average eye height, or facing upward for an electrical device that is near the ceiling or above an average eye height. The cover plate 204 is positioned such that the perimeter rim 252 is adjacent to or in contact with the surrounding wall surface 112, and the fastener 206 is threaded into the aperture 260 until the second end face 272 of the fastener is in contact with the inboard tab 244 and the first face 270 or head is generally flush or inset relative to with the peripheral edge 252 of the cover plate 204.

Figure 39:
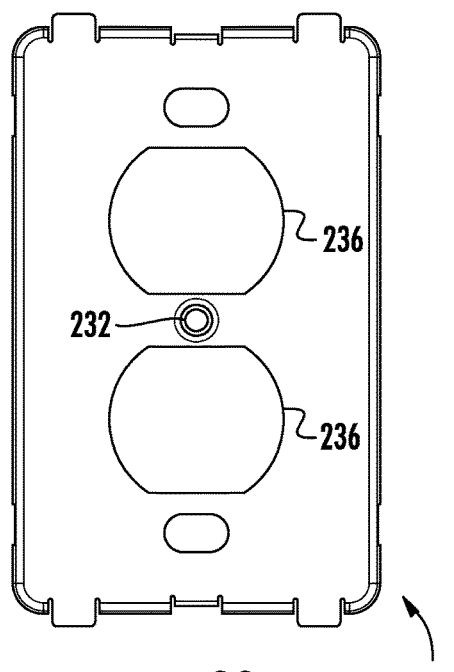
FIG. 39 is an elevation view of a subplate for a cover plate assembly according to an embodiment.
Figure 40:
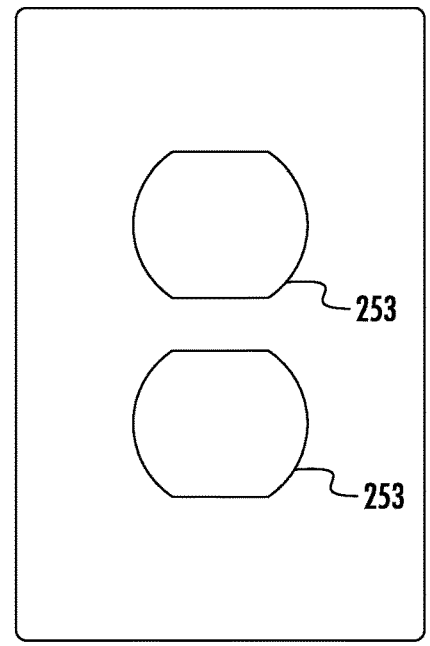
FIG. 40 is an elevation view of a cover plate for use with the subplate of FIG. 39.
Figure 41:
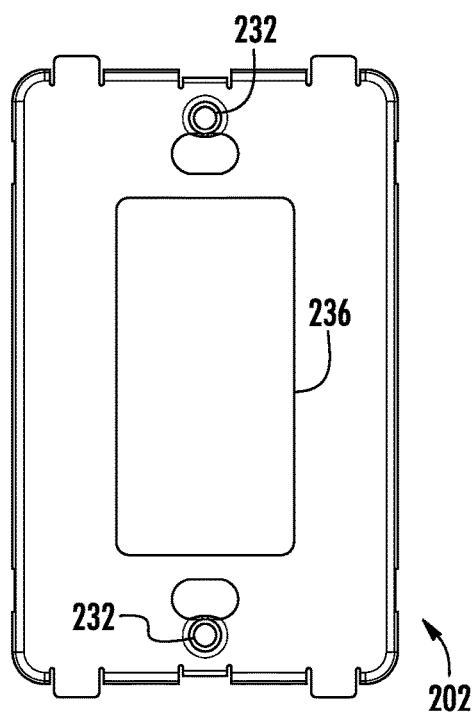
FIG. 41 is an elevation view of a subplate for a cover plate assembly according to an embodiment.
Figure 42:
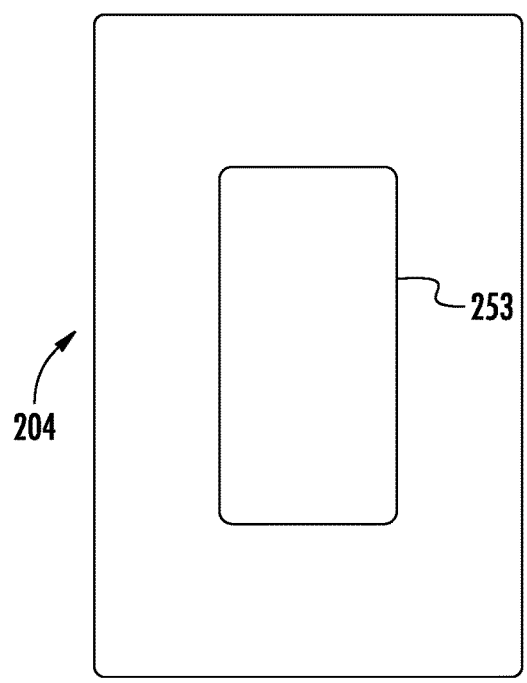
FIG. 42 is an elevation view of a cover plate for use with the subplate of FIG. 41.

The cover plate assembly 200 may have various shapes and sizes for use with different electrical devices. Various embodiments are shown as non-limiting examples of cover plate assemblies 200 that attach to the wall mounted electrical device as descried above with respect to FIGS. 23-36. These figures do not depict every embodiment; rather are included to illustrate the arrangements for common electrical devices. FIGS. 23 and 35-38 illustrate an example of a single gang cover plate assembly for a toggle switch. FIGS. 39-40 illustrate an example of a single gang cover plate assembly for an electrical outlet. FIGS. 41-42 illustrate an example of a single gang cover plate assembly for a decorative switch. The cover plate assembly 200 may also be provided for use with one than one gang, and may have a single threaded fastener, or more than one threaded fastener as described above.

The cover plate assembly 100, 200 permits attachment of the decorative cover plate which is free of mounting screw openings. The fastener allows the decorative cover plate to easily engage and be secured to the subplate.

When the subplate 102, 202 is assembled to the electrical device, and makes contact with the wall an overall projected thickness of the subplate from the wall is greater than a recess on the back of the cover plate 104, 204.

Historically, hidden fastener wall plates or cover plates have been designed with polymeric materials. Polymeric materials allow for flexible features to be included directly within the subplate or cover plate as an example for purposes of temporary attachment. These plastics are typically made with flame retardant additives which may be harmful to human health during manufacturing and are not readily recyclable at end of life. By avoiding polymeric materials, a product can be made which has no harmful health affects in production or use and is readily recyclable. Also, most polymeric materials do not readily accept plated metallic decorative finishes which can limit finish choices to the consumer. In addition, plated acrylonitrile butadiene styrene (ABS) materials, which are common in some consumer products, result in material contamination of both the plastic and the metal, making recycling of these materials undesirable from an economics perspective. The plastic material must be at least 2.5 millimeters thick to meet the applicable standards. However, the steel subplate 102, 202 meets the standards at a thickness of less than 2.5 millimeters. The steel subplate 102, 202 meets the applicable standards with a thickness of at least 0.8 millimeters thereby offering a reduced thickness in comparison to plastic.

Hidden fastener wall plate designs typically gain UL approval as a complete assembly. In contrast, the subplate 102, 202 meets the industry requirements alone. This approach allows for a wider use of materials for the purposes of manufacturing the hidden fastener decorative cover plate 104, 204 from materials which could not pass industry standards on their own. Materials which could be used for the hidden fastener decorative cover plate may be metal, wood, plastic, resin, glass, stone or ceramic, epoxy, or any decorative material. For non-metal cover plates, the threaded aperture may be provided in the cover plate material itself or as an insert provided in the cover plate.

The design of the subplate 102 minimizes the size and location of apertures through the subplate to meet industry standards while also minimizing an overall size of the cover plate assembly 100 to minimize cost.

A single wall plate can be sized to accept any number of electrical devices and in any combination thereof. The subplate 102, 202 may meet all of the industry standard requirements while the decorative cover plate 104, 204 can be made from any material to achieve its decorative purpose including but not limited to metal, steel, zinc, zinc alloys, wood, plastic, glass, stone and resin. By doing so, the subplate 102 can be made in large volumes at relatively low cost and the decorative cover plate 104, 204 avoids some of the restrictions imposed on electrical enclosures since those requirements are being accomplished by the subplate 102, 202. The consumer benefits from this design since decorative cover plate designs can be changed out to suit a change in decor without removing the UL rated subplate 102, 202. Models can be retailed which exclude the subplate 102, 202 for customers which already have a subplate 102, 202 installed, thereby removing the additional cost associated with that component.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical cover plate assembly comprising:
a subplate with a first substrate having a first edge and a second edge opposite to the first edge, wherein the first substrate forms a series of mounting slots, each mounting slot sized to receive a corresponding fastener of an electrical device for mounting the subplate to the electrical device;
a first tab extending outwardly from the first edge of the first substrate;
a second tab extending outwardly from the second edge of the first substrate;
a cover plate sized to extend over the subplate, with a second substrate sized to be mounted on the first substrate, and a peripheral rim extending from the second substrate to engage a wall and conceal the subplate, the cover plate defining a first locating slot positioned to receive the second tab of the subplate to locate and position the cover plate relative to the subplate, the cover plate defining an aperture extending through the peripheral rim and positioned to be aligned with the first tab of the subplate, wherein the first locating slot is defined by a base member and a pair of side members, the base member extending inwardly from an edge region of the peripheral rim of the cover plate, the pair of side members extending from the base member to the second substrate; and
a fastener sized to extend into the aperture and engage the cover plate and a surface of the first tab of the subplate to fasten the cover plate to the subplate.

2. The assembly of claim 1 wherein at least one of the fastener, the first tab and the second tab is angled such that a compression force applied from the fastener to the first tab biases the cover plate toward the subplate.

3. The assembly of claim 2 wherein the first tab and the second tab are angled to extend towards an intersection of the second substrate and the peripheral rim of the cover plate.

4. The assembly of claim 1 wherein the aperture is a threaded aperture; and
wherein the fastener is a set screw.

5. The assembly of claim 1 wherein the base member is provided with an angled wall facing the slot.

6. The assembly of claim 5 wherein the second tab is angled to mate with the angled wall of the base member such that a compression force applied from the fastener to the first tab biases the cover plate toward the subplate.

7. The assembly of claim 1 further comprising a third tab extending outwardly from the from the second edge of the first substrate, wherein the first tab is positioned between the second and third tabs; and
    wherein the cover plate defines a second locating slot positioned to receive the third tab of the subplate to locate and position the cover plate relative to the subplate.

8. The assembly of claim 7 further comprising
    a fourth tab extending outwardly from the first edge of the first substrate;
    a fifth tab extending outwardly from the first edge of the first substrate, the first tab positioned between the fourth and fifth tabs; and
    a sixth tab extending outwardly from the second edge of the first substrate and positioned between the second and third tabs, the sixth tab aligned with the first tab such that the subplate is mountable to the electrical device in a first orientation with the first edge being an upper edge and a second orientation with the second edge being the upper edge.

9. An electrical cover plate assembly comprising:
    a subplate with a first substrate having a first edge and a second edge opposite to the first edge, wherein the first substrate forms a series of mounting slots, each mounting slot sized to receive a corresponding fastener of an electrical device for mounting the subplate to the electrical device;
    a first tab extending outwardly from the first edge of the first substrate;
    a second tab extending outwardly from the second edge of the first substrate;
    a cover plate sized to extend over the subplate, with a second substrate sized to be mounted on the first substrate, and a peripheral rim extending from the second substrate to engage a wall and conceal the subplate, the cover plate defining a first rib to cooperate with the second tab of the subplate to locate and position the cover plate relative to the subplate, the cover plate defining an aperture extending through the peripheral rim and positioned to be aligned with the first tab of the subplate; and
    a fastener sized to extend into the aperture and engage the cover plate and a surface of the first tab of the subplate, an end of the fastener contacting the surface of the first tab of the subplate such that a compression force applied from the fastener to the surface of the first tab biases the cover plate toward the subplate to fasten the cover plate to the subplate.

10. The assembly of claim 9 wherein the first tab and the second tab are angled to extend away from the cover plate and towards one another; and
    wherein the first tab is aligned with the second tab such that the subplate is mountable to the electrical device in a first orientation with the first edge being an upper edge and a second orientation with the second edge being the upper edge.

11. The assembly of claim 10 wherein each of the first and second tabs forms an angle of forty to sixty degrees with the first substrate.

12. The assembly of claim 10 wherein the first rib forms an undercut angled surface facing the first substrate to mate with the angled second tab such that a compression force applied from the fastener to the first tab biases the cover plate toward the subplate.

13. The assembly of claim 9 wherein the aperture is a threaded aperture; and
    wherein the fastener is a set screw.

14. The assembly of claim 9 further comprising:
    a third tab extending outwardly from the second edge of the first substrate; and
    a fourth tab extending outwardly from the second edge of the first substrate, the first and second tabs being positioned between the third and fourth tabs;
    wherein the cover plate defines a second rib positioned to cooperate with the third tab of the subplate, and a third rib positioned to cooperate with the fourth tab of the subplate to locate and position the cover plate relative to the subplate.

15. The assembly of claim 9 further comprising:
    a fifth tab extending outwardly from the first edge of the first substrate; and
    a sixth tab extending outwardly from the first edge of the first substrate, the first and second tabs being positioned between the fifth and sixth tabs;
    wherein the cover plate defines a fourth rib positioned to cooperate with the fifth tab of the subplate, and a fifth rib positioned to cooperate with the sixth tab of the subplate to locate and position the cover plate relative to the subplate.

16. The assembly of claim 9 wherein the first tab and the second tab are angled to extend towards an intersection of the second substrate and the peripheral rim of the cover plate.

17. An electrical cover plate assembly comprising:
    a subplate with a first locating feature and a tab, the subplate sized to be mounted to an electrical device via attachment points associated with the electrical device;
    a cover plate sized to extend over the subplate, the cover plate forming a second locating feature positioned to cooperate with the first locating feature to locate the cover plate relative to the subplate, the cover plate defining a threaded aperture extending through a peripheral rim of the cover plate and positioned to be aligned with the tab; and
    a threaded fastener to cooperate with the threaded aperture and engage the cover plate and the tab of the subplate, wherein the threaded fastener extends from a first end to a second end, the second end of the fastener contacting a surface of the tab of the subplate such that a compression force applied from the fastener to the surface of the tab biases the cover plate toward the subplate to fasten the cover plate to the subplate, wherein at least one of the first locating feature, the second locating feature, the tab, and the fastener is angled.

18. The cover plate assembly of claim 17 wherein the first locating feature is a tab;
    wherein the second locating feature is one of a slot and a rib; and
    wherein the first end of the fastener defines a recessed shape sized to cooperate with a tool bit, wherein the fastener is threaded from the first end to the second end.

19. A method of installing a cover plate according to claim 17, the method comprising:
    mounting the subplate to the electrical device via the attachment points associated with the electrical device;
    positioning and locating the cover plate relative to the subplate by engaging the second locating feature of the cover plate with the first locating feature of the subplate; and
    fastening the cover plate to the subplate by inserting the threaded fastener into the threaded aperture of the cover plate until a second end of the threaded fastener engages the tab such that the tab is positioned between the cover plate and the second end of the threaded fastener, the threaded fastener being inserted until a first end of the threaded fastener is one of flush with an outer surface of the peripheral rim of the cover plate and inset from the outer surface.

\* \* \* \* \*